(12) United States Patent
Biadsy et al.

(10) Patent No.: US 10,832,664 B2
(45) Date of Patent: Nov. 10, 2020

(54) AUTOMATED SPEECH RECOGNITION USING LANGUAGE MODELS THAT SELECTIVELY USE DOMAIN-SPECIFIC MODEL COMPONENTS

(71) Applicant: Google LLC, Mountain View, CA (US)

(72) Inventors: Fadi Biadsy, New York, NY (US); Diamantino Antionio Caseiro, Philadelphia, PA (US)

(73) Assignee: Google LLC, Mountain View, CA (US)

( * ) Notice: Subject to any disclaimer, the term of this patent is extended or adjusted under 35 U.S.C. 154(b) by 205 days.

(21) Appl. No.: 15/682,133

(22) Filed: Aug. 21, 2017

(65) Prior Publication Data
US 2018/0053502 A1   Feb. 22, 2018

Related U.S. Application Data

(60) Provisional application No. 62/377,264, filed on Aug. 19, 2016.

(51) Int. Cl.
G06F 17/27 (2006.01)
G10L 15/197 (2013.01)
(Continued)

(52) U.S. Cl.
CPC ............ *G10L 15/197* (2013.01); *G10L 15/02* (2013.01); *G10L 15/18* (2013.01); *G10L 15/32* (2013.01); *G10L 15/183* (2013.01); *G10L 15/19* (2013.01)

(58) Field of Classification Search
CPC ........ G10L 15/02; G10L 15/197; G10L 15/32
See application file for complete search history.

(56) References Cited

U.S. PATENT DOCUMENTS 4,820,059 A   4/1989   Miller et al.
5,267,345 A   11/1993  Brown et al.
(Continued)

FOREIGN PATENT DOCUMENTS

DE   10045020   5/2001
EP   2383663    9/2005
(Continued)

OTHER PUBLICATIONS

P. Brown et al., "Class based n-gram models of natural language," Computational Linguistics, vol. 18, No. 4, 1992.*
(Continued)

*Primary Examiner* — Richard Z Zhu
(74) *Attorney, Agent, or Firm* — Honigman LLP; Brett A. Krueger

(57) ABSTRACT

Methods, systems, and apparatus, including computer programs encoded on a computer storage medium, for language models using domain-specific model components. In some implementations, context data for an utterance is obtained. A domain-specific model component is selected from among multiple domain-specific model components of a language model based on the non-linguistic context of the utterance. A score for a candidate transcription for the utterance is generated using the selected domain-specific model component and a baseline model component of the language model that is domain-independent. A transcription for the utterance is determined using the score the transcription is provided as output of an automated speech recognition system.

19 Claims, 9 Drawing Sheets

(51) Int. Cl.
*G10L 15/02* (2006.01)
*G10L 15/32* (2013.01)
*G10L 15/18* (2013.01)
G10L 15/183 (2013.01)
G10L 15/19 (2013.01)

(56) References Cited

U.S. PATENT DOCUMENTS

| | | |
|---|---|---|
| 5,632,002 A | 5/1997 | Hashimoto et al. |
| 5,638,487 A | 6/1997 | Chigier |
| 5,715,367 A | 2/1998 | Gillick et al. |
| 5,737,724 A | 4/1998 | Atal et al. |
| 5,768,603 A | 6/1998 | Brown et al. |
| 5,805,832 A | 9/1998 | Brown et al. |
| 5,822,729 A | 10/1998 | Glass |
| 5,822,730 A | 10/1998 | Roth et al. |
| 6,021,403 A | 2/2000 | Horvitz et al. |
| 6,119,186 A | 9/2000 | Watts et al. |
| 6,167,377 A | 12/2000 | Gillick et al. |
| 6,182,038 B1 | 1/2001 | Balakrishnan et al. |
| 6,317,712 B1 | 11/2001 | Kao et al. |
| 6,397,180 B1 | 5/2002 | Jaramillo et al. |
| 6,418,431 B1 | 7/2002 | Mahajan et al. |
| 6,446,041 B1 | 9/2002 | Reynar et al. |
| 6,539,358 B1 | 3/2003 | Coon et al. |
| 6,581,033 B1 | 6/2003 | Reynar et al. |
| 6,678,415 B1 | 1/2004 | Popat et al. |
| 6,714,778 B2 | 3/2004 | Nykänen et al. |
| 6,778,959 B1 | 8/2004 | Wu et al. |
| 6,839,670 B1 | 1/2005 | Stammler et al. |
| 6,876,966 B1 | 4/2005 | Deng et al. |
| 6,912,499 B1 | 6/2005 | Sabourin et al. |
| 6,922,669 B2 | 7/2005 | Schalk et al. |
| 6,950,796 B2 | 9/2005 | Ma et al. |
| 6,959,276 B2 | 10/2005 | Droppo et al. |
| 7,027,987 B1 | 4/2006 | Franz et al. |
| 7,043,422 B2 | 5/2006 | Gao et al. |
| 7,149,688 B2 | 12/2006 | Schalkwyk |
| 7,149,970 B1 | 12/2006 | Pratley et al. |
| 7,174,288 B2 | 2/2007 | Ju et al. |
| 7,200,550 B2 | 4/2007 | Menezes et al. |
| 7,257,532 B2 | 8/2007 | Toyama |
| 7,310,601 B2* | 12/2007 | Nishizaki .............. G10L 15/32 704/240 |
| 7,366,668 B1 | 4/2008 | Franz et al. |
| 7,370,275 B2 | 5/2008 | Haluptzok et al. |
| 7,383,553 B2 | 6/2008 | Atkin et al. |
| 7,392,188 B2 | 6/2008 | Junkawitsch et al. |
| 7,403,888 B1 | 7/2008 | Wang et al. |
| 7,424,426 B2 | 9/2008 | Furui et al. |
| 7,424,428 B2 | 9/2008 | Rose et al. |
| 7,451,085 B2 | 11/2008 | Rose et al. |
| 7,505,894 B2 | 3/2009 | Menezes et al. |
| 7,526,431 B2 | 4/2009 | Roth et al. |
| 7,577,562 B2 | 8/2009 | Menezes et al. |
| 7,634,720 B2 | 12/2009 | Haluptzok et al. |
| 7,672,833 B2 | 3/2010 | Blume et al. |
| 7,698,124 B2 | 4/2010 | Menezes et al. |
| 7,698,136 B1 | 4/2010 | Nguyen et al. |
| 7,739,286 B2* | 6/2010 | Sethy ................... G10L 15/18 707/737 |
| 7,752,046 B2* | 7/2010 | Bacchiani ............ G06K 9/6226 704/245 |
| 7,778,816 B2 | 8/2010 | Reynar |
| 7,805,299 B2 | 9/2010 | Coifman |
| 7,831,427 B2 | 11/2010 | Potter et al. |
| 7,848,927 B2 | 12/2010 | Ohno et al. |
| 7,881,936 B2 | 2/2011 | Longé et al. |
| 7,890,326 B2 | 2/2011 | Strope et al. |
| 7,907,705 B1 | 3/2011 | Huff et al. |
| 7,941,189 B2 | 5/2011 | Miyauchi |
| 7,953,692 B2 | 5/2011 | Bower et al. |
| 7,996,220 B2 | 8/2011 | Rose et al. |
| 8,001,130 B2 | 8/2011 | Wen et al. |
| 8,005,680 B2 | 8/2011 | Kommer |
| 8,009,678 B2 | 8/2011 | Brooke |
| 8,027,973 B2 | 9/2011 | Cao et al. |
| 8,060,373 B2 | 11/2011 | Gibbon et al. |
| 8,069,027 B2 | 11/2011 | Liu et al. |
| 8,069,043 B2 | 11/2011 | Bacchiani et al. |
| 8,265,928 B2* | 9/2012 | Kristjansson ....... G10L 21/0208 704/227 |
| 8,296,142 B2 | 10/2012 | Lloyd et al. |
| 8,352,245 B1 | 1/2013 | Lloyd |
| 8,352,246 B1 | 1/2013 | Lloyd |
| 8,396,709 B2 | 3/2013 | Lloyd et al. |
| 8,468,012 B2 | 6/2013 | Lloyd et al. |
| 8,473,289 B2 | 6/2013 | Jitkoff et al. |
| 8,521,526 B1 | 8/2013 | Lloyd et al. |
| 8,532,994 B2 | 9/2013 | Malegaonkar et al. |
| 8,694,313 B2 | 4/2014 | Lloyd et al. |
| 8,751,217 B2 | 6/2014 | Ballinger et al. |
| 9,047,870 B2 | 6/2015 | Ballinger et al. |
| 9,495,127 B2 | 11/2016 | Ballinger et al. |
| 9,972,311 B2* | 5/2018 | Levit .................... G06F 40/216 |
| 2002/0062216 A1 | 5/2002 | Guenther et al. |
| 2002/0078091 A1 | 6/2002 | Vu et al. |
| 2002/0087309 A1 | 7/2002 | Lee et al. |
| 2002/0087314 A1 | 7/2002 | Fischer et al. |
| 2002/0111990 A1 | 8/2002 | Wood et al. |
| 2002/0165714 A1* | 11/2002 | Beyerlein ............... G06F 17/17 704/243 |
| 2003/0050778 A1 | 3/2003 | Nguyen et al. |
| 2003/0149561 A1 | 8/2003 | Zhou |
| 2003/0216919 A1 | 11/2003 | Roushar |
| 2003/0236099 A1 | 12/2003 | Deisher et al. |
| 2004/0024583 A1 | 2/2004 | Freeman |
| 2004/0043758 A1 | 3/2004 | Sorvari et al. |
| 2004/0049388 A1 | 3/2004 | Roth et al. |
| 2004/0098571 A1 | 5/2004 | Falcon |
| 2004/0138882 A1 | 7/2004 | Miyazawa |
| 2004/0172258 A1 | 9/2004 | Dominach et al. |
| 2004/0230420 A1 | 11/2004 | Kadambe et al. |
| 2004/0243415 A1 | 12/2004 | Commarford et al. |
| 2005/0005240 A1 | 1/2005 | Reynar et al. |
| 2005/0055210 A1* | 3/2005 | Venkataraman ....... G10L 15/065 704/255 |
| 2005/0080632 A1* | 4/2005 | Endo ..................... G10L 15/08 704/277 |
| 2005/0108017 A1 | 5/2005 | Esser et al. |
| 2005/0114474 A1 | 5/2005 | Anderson et al. |
| 2005/0119885 A1* | 6/2005 | Axelrod ................. G10L 15/063 704/231 |
| 2005/0187763 A1 | 8/2005 | Arun |
| 2005/0193144 A1 | 9/2005 | Hassan et al. |
| 2005/0216273 A1 | 9/2005 | Reding et al. |
| 2005/0234723 A1* | 10/2005 | Arnold .................. G10L 15/065 704/257 |
| 2005/0246325 A1 | 11/2005 | Pettinati et al. |
| 2005/0283364 A1 | 12/2005 | Longe et al. |
| 2006/0004572 A1 | 1/2006 | Ju et al. |
| 2006/0004850 A1 | 1/2006 | Chowdhury |
| 2006/0009974 A1 | 1/2006 | Junqua et al. |
| 2006/0035632 A1 | 2/2006 | Sorvari et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0212288 A1* | 9/2006 | Sethy ..................... G10L 15/18 704/10 |
| 2006/0247915 A1 | 11/2006 | Bradford et al. |
| 2007/0060114 A1 | 3/2007 | Ramer et al. |
| 2007/0174040 A1 | 7/2007 | Liu et al. |
| 2008/0027723 A1 | 1/2008 | Reding et al. |
| 2008/0091406 A1 | 4/2008 | Baldwin et al. |
| 2008/0091435 A1 | 4/2008 | Strope et al. |
| 2008/0091443 A1 | 4/2008 | Strope et al. |
| 2008/0131851 A1 | 6/2008 | Kanevsky et al. |
| 2008/0133228 A1 | 6/2008 | Rao |
| 2008/0162117 A1 | 7/2008 | Bangalore et al. |
| 2008/0188271 A1 | 8/2008 | Miyauchi |
| 2008/0221887 A1 | 9/2008 | Rose et al. |

(56) References Cited

U.S. PATENT DOCUMENTS

| | | | |
|---|---|---|---|
| 2008/0221902 A1* | 9/2008 | Cerra | G10L 15/065 704/270.1 |
| 2008/0243481 A1 | 10/2008 | Brants et al. | |
| 2008/0301112 A1 | 12/2008 | Wu | |
| 2009/0030687 A1 | 1/2009 | Cerra et al. | |
| 2009/0030696 A1 | 1/2009 | Cerra et al. | |
| 2009/0083023 A1 | 3/2009 | Foster et al. | |
| 2009/0150160 A1 | 6/2009 | Mozer | |
| 2009/0164216 A1 | 6/2009 | Chengalvarayan et al. | |
| 2009/0210214 A1 | 8/2009 | Qian et al. | |
| 2009/0271177 A1 | 10/2009 | Menezes et al. | |
| 2009/0271188 A1 | 10/2009 | Agapi et al. | |
| 2009/0287681 A1 | 11/2009 | Paek et al. | |
| 2009/0292529 A1 | 11/2009 | Bangalore et al. | |
| 2010/0004930 A1 | 1/2010 | Strope et al. | |
| 2010/0049502 A1 | 2/2010 | Oppenheim et al. | |
| 2010/0088303 A1 | 4/2010 | Chen et al. | |
| 2010/0100377 A1 | 4/2010 | Madhavapeddi et al. | |
| 2010/0153219 A1 | 6/2010 | Mei et al. | |
| 2010/0169094 A1 | 7/2010 | Akamine et al. | |
| 2010/0179803 A1 | 7/2010 | Sawaf et al. | |
| 2010/0254521 A1 | 10/2010 | Kriese et al. | |
| 2010/0318531 A1 | 12/2010 | Gao et al. | |
| 2010/0325109 A1 | 12/2010 | Bai et al. | |
| 2011/0004462 A1 | 1/2011 | Houghton et al. | |
| 2011/0066577 A1 | 3/2011 | Van Gael et al. | |
| 2011/0077943 A1 | 3/2011 | Miki et al. | |
| 2011/0093265 A1 | 4/2011 | Stent et al. | |
| 2011/0137653 A1 | 6/2011 | Ljolje et al. | |
| 2011/0144992 A1 | 6/2011 | Toutanova et al. | |
| 2011/0162035 A1 | 6/2011 | King et al. | |
| 2011/0224982 A1 | 9/2011 | Acero et al. | |
| 2011/0231183 A1 | 9/2011 | Yamamoto et al. | |
| 2012/0022866 A1 | 1/2012 | Ballinger et al. | |
| 2012/0022873 A1 | 1/2012 | Ballinger et al. | |
| 2012/0084235 A1 | 4/2012 | Suzuki et al. | |
| 2012/0316862 A1 | 12/2012 | Sultan et al. | |
| 2012/0316877 A1* | 12/2012 | Zweig | G10L 15/197 704/251 |
| 2013/0046619 A1 | 2/2013 | Translateur et al. | |
| 2014/0324434 A1 | 10/2014 | Vozila | |
| 2015/0228279 A1* | 8/2015 | Biadsy | G10L 15/26 704/235 |
| 2016/0275946 A1* | 9/2016 | Caseiro | G06F 17/2715 |

FOREIGN PATENT DOCUMENTS

| | | |
|---|---|---|
| WO | WO 1999031654 | 6/1999 |
| WO | WO 2002073331 | 9/2002 |
| WO | WO 2002096070 | 11/2002 |
| WO | WO 2012170817 | 12/2012 |
| WO | WO 2013083132 | 6/2013 |
| WO | WO 2013192218 | 12/2013 |

OTHER PUBLICATIONS

Bocchieri et al., "Use of geographical meta-data in ASR language and acoustic models", Acoustics Speech and Signal Processing (ICASSP), 2010 IEEE International Conference on IEEE, Mar. 14, 2010, 4 pages.

Collins, "Log-Linear Models," Self-published Tutorial [online] [retrieved on Feb. 10, 2014]. Retrieved from the internet: URL< http://www.cs.columbia.edu/~mcollins/loglinear.pdf> 20 pages.

Dhillon. "Co-clustering documents and words using bipartite spectral graph partitioning," In Proceedings of the seventh ACM SIGKDD international conference on Knowledge discovery and data mining, (KDD '01). ACM, New York, NY, USA, 2001, 6 pages.

Extended European Search Report, Application No. EP 10 165 480.4, dated Oct. 24, 2011, 9 pages.

Frey, et al., "ALGONQUIN: Iterating Laplace's Method to Remove Multiple Types of Acoustic Distortion for Robust Speech Recognition", EuroSpeech 2001 Scandinavia, 7th European Conference on Speech Communication and Technology, Aalborg, Denmark, Sep. 3-7, 2001, 4 pages.

International Search Report and Written Opinion in International Application No. PCT/US2012/021221, dated Apr. 5, 2012, 11 pages.

International Search Report and Written Opinion in International Application No. PCT/US2011/046629, dated Dec. 9, 2011, 14 pages.

International Search Report and Written Opinion in International Application No. PCT/US2011/037558, dated Jul. 29, 2011, 11 pages.

International Search Report and Written Opinion in International Application No. PCT/US2011/029407, dated Jun. 7, 2011, 10 pages.

International Search Report and Written Opinion in International Application No. PCT/US2011/036984, dated Aug. 31, 2011, 13 pages.

Kristjansson, et al., "Super-Human Multi-Talker Speech Recognition: The IBM 2006 Speech Separation Challenge System", INTERSPEECH 2006: ICSLP; Proceedings of the Ninth International Conference on Spoken Language Process, Sep. 17-21, 2006, Pittsburgh, Pennsylvania, USA, Bonn, ISCA, 2006, 4 pages.

Lee et al. "Search Result Clustering Using Label Language Model." IJCNLP 2008, The Third International Joint Conference on Natural Language Processing. Hyderabad, India, Jan. 7-12, 2008, 6 pages.

Liu et al. "Cluster-based retrieval using language models," Proceedings of the 27th annual international ACM SIGIR conference on Research and development in information retrieval, (SIGIR '04). ACM, New York, NY, USA, 2004, 8 pages.

Mohri et al. "Weighted Finite-State Transducers in Speech Recognition," Computer Speech & Language, vol. 16, Issue 1, Jan. 2002, 27 pages.

Vertanen. "An Overview of Discriminative Training for Speech Recognition." Technical Report, University of Cambridge, UK, 2004, 14 pages.

Wikipedia.com, "Gradient descent," Jan. 7, 2014 [retrieved on Feb. 10, 2014]. Retrieved from the internet: URL< http://en.wikipedia.org/wiki/Gradient_descent>. 8 pages.

Wikipedia.com, "Language Model," Dec. 22, 2013, [retrieved on Feb. 10, 2014]. Retrieved from the internet: URL< http://en.wikipedia.org/wiki/Language_model>. 3 pages.

Wikipedia.com, "Log-linear model," Apr. 6, 2013 [retrieved on Feb. 10, 2014]. Retrieved from the internet: URL< http://en.wikipedia.org/wiki/Log-linear_model>. 1 page.

Xu et al. "Using social annotations to improve language model for information retrieval." In: Proceedings of the sixteenth ACM conference on Conference on information and knowledge management, (CIKM '07). ACM, New York, NY, USA, 2007, 4 pages.

Zha et al. "Bipartite graph partitioning and data clustering." In Proceedings of the tenth international conference on Information and knowledge management (CIKM '01), Henrique Paques, Ling Liu, and David Grossman (Eds.). 2001, ACM, New York, NY, USA, 8 pages.

Zweig, G., "New Methods for the Analysis of Repeated Utterances", InterSpeech 2009, 10th Annual Conference of the International Speech Communication Association, Brighton, United Kingdom, Sep. 6-10, 2009, 4 pages.

Zweig, G., et al., "Structured Models for Joint Decoding of Repeated Utterances", InterSpeech 2008, 9th Annual Conference of the International Speech Communication Association, Brisbane, Australia, Sep. 22-26, 2008, 4 pages.

* cited by examiner

AUTOMATED SPEECH RECOGNITION USING LANGUAGE MODELS THAT SELECTIVELY USE DOMAIN-SPECIFIC MODEL COMPONENTS

CROSS-REFERENCE TO RELATED APPLICATION

This application claims priority to U.S. Provisional Patent Application No. 62/377,264, filed on Aug. 19, 2016, the entire contents of which is incorporated herein by reference.

FIELD

The present specification relates to language models.

BACKGROUND

The use of speech recognition is becoming more and more common. As technology has advanced, users of computing devices have gained increased access to speech recognition functionality. Many users rely on speech recognition in their professions and in other aspects of daily life.

SUMMARY

In some implementations, language models may use information about non-linguistic context to increase the accuracy of automatic speech recognition. Information about the environment or situation that a user is in, as well as information about the user, can be used to determine which words it is likely for a user to have spoken. In general, users may be more likely to speak certain words in some environments than in other environments. For example, when a user is located in New York City, it may be more likely for the user to say the name of a restaurant located in New York City than to say the name of a restaurant located in a different city. As another example, users may commonly use a first set of words or phrases when using an application for composing a short message service (SMS) text message, but users may use a different set of words and phrases when using a map application.

A language model may include one or more domain-specific model components corresponding to different domains or types of non-linguistic context data. The language model can also include a baseline model component that can operate independent of non-linguistic context data. The baseline model component and the one or more domain-specific model components can be used together to determine a score for a language sequence using both linguistic and non-linguistic context information.

For example, the language model may be a log-linear model, and the baseline model component and the domain-specific model components each include weights corresponding to n-gram features. If non-linguistic context data is not available or does not match any of the domain-specific model components, the baseline model component alone is used to recognize speech. If speech is known to occur in a non-linguistic context corresponding to one or more of the domain-specific model components, then the relevant domain-specific model components and the baseline model component are used together to recognize the speech. For example, if a user is in New York City, the log-linear model weights in a domain-specific model component for New York City are used, along with the log-linear model weights of the baseline model component, while the domain-specific model components for other locations are not used. As a result, different domain-specific model components are used with the baseline model component at different times and for different users, depending on the non-linguistic context when speech is detected.

Domains can represent various different aspects of non-linguistic context. For example, a domain may represent a location (e.g., being located in a particular country, a particular city, or other location), a user characteristic (e.g., that the user is male or female, the user speaks a particular dialect, etc.), an application running on a device (e.g., a maps application, an email application, etc.), a time (e.g., a particular day, a time of day, a weekend or weekday, etc.), a device status (e.g., in a vehicle, moving or not moving, etc.), or another aspect of non-linguistic context.

In many cases, training a language model using aspects of non-linguistic context presents a number of challenges. For example, the amount of training data giving examples in specific domains is generally small, much smaller than the amount of training data showing general language usage. As a result, the sparsity of domain-specific examples may not allow domain-specific training for many of the words and phrases in the language model, and in many instances the language model may effectively ignore the domain-specific information. Another challenge is that the overall performance of the model may be negatively affected by domain-specific information. For example, examples of words entered to a maps application may inappropriately increase the likelihood that the model provides for those examples, even for speech that is not provided to the maps application. In addition, the order of samples used in training and the learning rate parameters used can greatly affect the accuracy of the final model. Finally, there are a vast number of possible combinations of n-grams and different contextual factors. It would be not be feasible to train a model with features for each of these combinations, since it would require an extreme number of training examples, and would require a model of excessive size and complexity.

Various implementations of the techniques disclosed herein address one or more of these challenges. For example, a language model can include a baseline model component that is domain-independent, and one or more domain-specific components that correspond to domains representing different non-linguistic contexts. This model structure allows the domain-specific components to have a meaningful influence when a matching context is present, while avoiding improper influence of the domain information on the baseline model component. The baseline model component can be trained first. Then, parameters of the baseline model component can be held constant while the domain-specific model components are each trained separately. The domain-specific model components are trained using the trained baseline model component, but do not affect the baseline model component. Regardless of the amount, content, and ordering of training data for different domains, the accuracy of the baseline model is not affected. This preserves the accuracy of the model for general use, for example, when non-linguistic context information is not provided or does not correspond to any domain-specific model components. In addition, each domain-specific model component can be focused on the most frequently occurring n-grams for its domain, which limits the total number of features needed in the language model and trains the features that are most significant for each domain using the limited set of training data available.

The domain-specific model components may include parameters for multiple sets of features, such as unigrams, bigrams, or other n-grams. The various domain-specific model components may include parameters for different sets of n-grams, with each domain-specific model component including parameters representing the n-grams that occur most commonly in the corresponding domain. When the language model is used to recognize speech, the speech recognition system uses non-linguistic context information to select which domain-specific model components to use. The baseline model component and the selected domain-specific model components are used to determine scores for candidate transcriptions.

One innovative aspect of the subject matter described in this specification is embodied in methods that include the actions of: obtaining a baseline language model for speech recognition, the baseline language model being configured to determine likelihoods of language sequences based on linguistic information, and accessing, for each domain of a set of multiple domains, a respective set of training data indicating language occurring in a particular non-linguistic context associated with the domain. The method can also include generating multiple domain-specific model components based on the training data and training each of the domain-specific model components using the respective set of training data for the domain of the domain-specific model component, wherein training includes updating parameters of the domain-specific model component using output of the baseline language model without changing parameters of the baseline language model.

Other implementations of this and other aspects include corresponding systems, apparatus, and computer programs, configured to perform the actions of the methods, encoded on computer storage devices.

Implementations may each optionally include one or more of the following features. In some implementations, obtaining the baseline language model for speech recognition includes training the baseline model using language sequences not labeled as occurring in the non-linguistic contexts associated with the domains.

In some implementations, the linguistic information corresponds to previous words in a sentence.

In some implementations, wherein the baseline language model does not use non-linguistic context information.

In some implementations, the baseline language model is a log-linear model, and the baseline language model and the domain-specific model components form a log-linear model.

In some implementations, the set of multiple domains includes one or more of particular applications, particular times, particular locations, particular user types or user characteristics, and particular events.

In some implementations, the training data for a particular domain includes text of user input labeled as being provided in the particular domain.

In some implementations, generating multiple domain-specific model components based on the training data includes initializing weights of the domain-specific model components to zero, so that at the beginning of training, output using the baseline language model and the domain-specific model components is equal to output of the baseline language model alone.

In some implementations, generating multiple domain-specific model components based on the training data includes using multiple feature sets for each domain-specific model component.

In some implementations, the multiple domain-specific model components include one or more of a unigram feature set, a bigram feature set, or a trigram feature set.

In some implementations, generating multiple domain-specific model components based on the training data includes: determining, for each of the multiple domain-specific model components, a set of n-grams, the sets of n-grams for the different domain-specific model components being determined using different sets of training data; and generating each of the domain-specific model components to include features corresponding to the set of n-grams determined for the domain-specific model component.

In some implementations, determining the set of n-grams for a domain-specific model component includes selecting a subset of n-grams that occur in the training data for the domain-specific model component using a frequency-based cutoff.

In some implementations, the baseline model has features corresponding to a set of n-grams, and each of the domain-specific model components has fewer features than the baseline model.

In some implementations, the n-grams determined for the domains represent terms or phrases having corresponding features and weights in the baseline language model.

In some implementations, training each of the domain-specific model components using the respective set of training data for the domain of the domain-specific model component includes training using stochastic gradient descent.

In some implementations, training each of the domain-specific model components using the respective set of training data for the domain of the domain-specific model component includes: generating a score for a language sequence that occurs in a first non-linguistic context using (i) weights of the baseline language model and (ii) weights of at least one of the domain-specific model components that corresponds to the first non-linguistic context.

In some implementations, generating the score includes generating the score independent of domain-specific model components for domains that do not correspond to the non-linguistic context.

In some implementations, training each of the domain-specific model components includes adjusting the weights of the at least one of the domain-specific model components that corresponds to the first non-linguistic context based on the generated score, while not adjusting the weights of the baseline language model.

In some implementations, the method includes providing a combined language model that includes the baseline model and the domain-specific model components, the combined language model being configured to generate a language model score using the baseline language together with zero or more of the domain-specific model components dynamically selected according to the non-linguistic context of audio data to be recognized using the combined language model.

In some implementations, the combined language model provides output equal to output of the baseline language model alone when the non-linguistic context of audio data to be recognized does not correspond to any of the domains of the domain-specific model components.

Another innovative aspect of the subject matter described in this specification is embodied in methods that include the actions of: obtaining context data for an utterance, the context data indicating (i) a linguistic context that includes one or more words preceding the utterance, and (ii) a non-linguistic context; selecting, from among multiple domain-specific model components of a language model, a domain-specific model component based on the non-linguistic context of the utterance; generating a score for a candidate transcription for the utterance using the language model, the score being generated using (i) the selected domain-specific model component, and (ii) a baseline model component of the language model that is domain-independent; determining a transcription for the utterance using the score; and providing the transcription as output of an automated speech recognition system.

In some implementations, the domain-specific model components each correspond to a different domain in a set of multiple domains, and the baseline model does not correspond to any of the multiple domains.

In some implementations, the baseline model component is configured to provide a language model score independent of non-linguistic context information.

In some implementations, generating the score for a candidate transcription for the utterance using the language model includes generating the score without using the domain-specific model components that were not selected.

In some implementations, the baseline model component and each of the domain-specific model components are log-linear models, each of the log-linear models comprising weights corresponding to a respective set of features.

In some implementations, the respective set of features for each of the log-linear models includes n-gram features.

In some implementations, the baseline model component includes weights for features that represent occurrence of n-grams independent of non-linguistic context; and the domain-specific model components include weights for features that represent occurrence of n-grams in specific non-linguistic contexts, each of the domain-specific model components having weights for a different non-linguistic context.

In some implementations, the language model includes (i) the baseline model component, which uses linguistic context information and does not use non-linguistic context information, and (ii) the domain-specific model components, which use both linguistic context information and non-linguistic context information.

In some implementations, each of the domains corresponds to at least one of a location, a time condition, a user characteristic, a device characteristic, or a device status.

In some implementations, generating the score for the candidate transcription includes: generating the score using a scoring function that changes according to which domain-specific model components are selected.

In some implementations, generating the score for the candidate transcription includes: determining (i) first feature values for first n-gram features of the baseline model component and (ii) second feature values for the second n-gram features of the selected domain-specific model component.

In some implementations, the second n-gram features of the domain-specific model component correspond to a subset of words or phrases having n-gram features in the baseline model component, but represent occurrence of the words or phrases in the particular non-linguistic context associated with the domain-specific model component.

In some implementations, generating the score for the candidate transcription for the utterance using the language model includes: multiplying the first feature values with corresponding weights for the first n-gram features in the baseline model; multiplying the second feature values with corresponding weights for the second n-gram features in the selected domain-specific model component; and generating the score using a sum of the results of the multiplications.

In some implementations, generating the score for the candidate transcription for the utterance using the language model includes: determining a sum of (i) weights for the first n-gram features of the baseline model and (ii) weights for the second n-gram features of the selected domain-specific model component; and generating the score based on the sum.

In some implementations, the method includes: obtaining data indicating multiple candidate transcriptions for the utterance; generating a score for each of the multiple candidate transcriptions, wherein the score for each of the multiple candidate transcriptions is generated using the baseline language model component and the selected domain-specific model component. Determining the transcription for the utterance can include selecting, as the transcription for the utterance, a particular candidate transcription of the multiple candidate transcriptions based on the generated scores.

In some implementations, each of the domain-specific model components has multiple feature sets.

In some implementations, generating the score for the candidate transcription includes generating the score using at least one, but less than all, of the feature sets of the selected domain-specific model component.

In some implementations, generating the score for the candidate transcription includes generating the score using all of the feature sets of the selected domain-specific model component.

In some implementations, the method includes dynamically changing which domain-specific components are used to recognize different utterances in a sequence based on changes in the non-linguistic context for the utterances.

Advantageous implementations can include one or more of the following features. The accuracy of speech recognition may be increased by taking into account the situation of the user that is speaking. A language model may provide estimates using linguistic and non-linguistic contextual information. The language model may be accessed to generate multiple domain-specific model components based on training data that can include linguistic and non-linguistic contextual information. The domain-specific model components can improve the accuracy of a speech recognition for a particular domain while remaining independent from the initial language model. Further, the amount of time and computation required to generate a model that corresponds to a particular context can be decreased, while providing better accuracy with less training data. For example, using a baseline model, a relatively small amount of training data for a specific context may be used to tailor recognition for that context.

The techniques described in this document are applicable to many modelling techniques. The technique of forming a log-linear model having a baseline component as well as domain-specific adaption components, and the process of training, is widely applicable. While language modelling for speech recognition is discussed in detail, the same techniques can be used for any application involving language modeling, including machine translation, parsing, and so on. Further, apart from language modeling, the techniques can be used to generate, train, and use models for, e.g., spam detection, image classification, visual analysis, and in conditional random field models.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
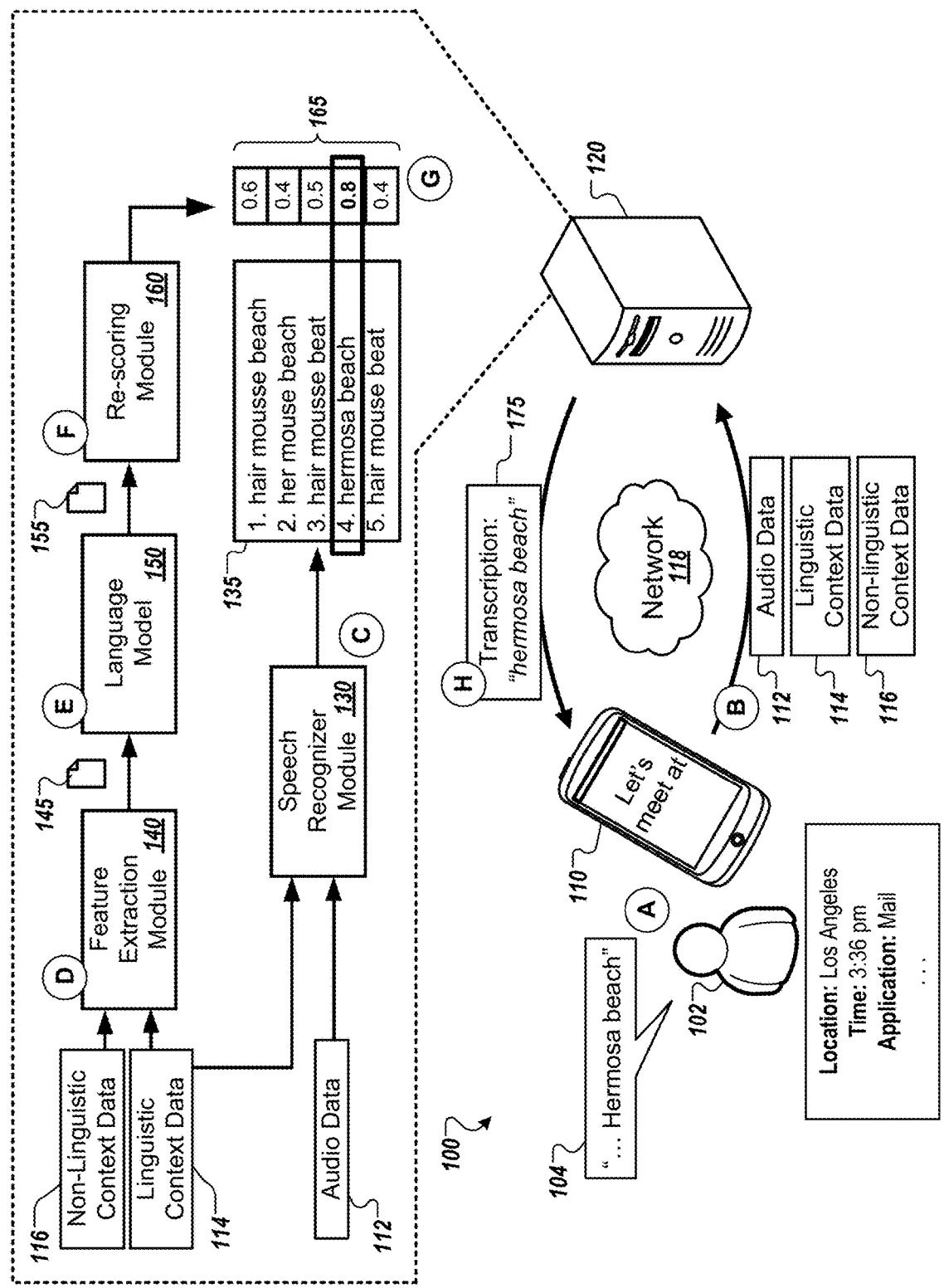
FIG. 1 is a diagram that illustrates an example of a system for speech recognition with a language model using non-linguistic context.

FIG. 1 is a diagram that illustrates an example of a system 100 for speech recognition with a language model using non-linguistic context. The system 100 includes a client device 110, a computing system 120, and a network 118. In the example, the computing system 120 receives audio data 112 and non-linguistic context data 116 from the client device 110. The computing system 120 provides scores determined from the non-linguistic context data 116 to a language model 150, which provides output that the computing system 120 uses to determine a transcription for the audio data 112. The figure shows stages (A) to (H) which illustrate a flow of data.

The client device 110 can be, for example, a desktop computer, a laptop computer, a cellular phone, a smart phone, a tablet computer, a music player, an e-book reader, a wearable computer, a navigation system, or other device. The functions performed by the computing system 120 can be performed by individual computer systems or can be distributed across multiple computer systems, e.g., one or more server systems. The network 118 can be wired or wireless or a combination of both, and may include private networks and/or public networks, such as the Internet.

In some implementations, a system receives audio data indicating characteristics of an utterance and context data indicating non-linguistic context of the utterance. Scores for one or more non-linguistic features can be generated based on the context data. The scores can be provided to a language model trained to estimate likelihoods based at least in part on scores for non-linguistic features. Output of the language model can be received and used to determine a transcription for the utterance. In some implementations, the language model is a log-linear model. In some implementations, the language model is a maximum entropy model, a support vector machine model, a neural network, a set of classifiers, or another type of model.

In the example of FIG. 1, during stage (A), a user 102 speaks and the client device 110 detects the utterance 104 of the user 102. For example, the client device 110 may record the utterance 104 using a microphone. The user 102 may provide the utterance 104 as voice input to any of a variety of applications, including, for example, an e-mail application, a calendar application, a mapping or navigation application, and so on. Thus, the utterance 104 may represent any of a variety of types of input, for example, a query, a message recipient, the body of a message, a voice command, an address, a phone number, and so on.

In the illustrated example, the user 102 is dictating the contents of an e-mail message while a "Mail" application is running on the client device 110. The user 102 previously entered the text "Let's meet at" as part of the message, and the utterance 104 includes the words "Hermosa beach" as further input to add to the message.

During stage (B), the client device 110 collects information and sends information to the computing system 120 over the network 118. The information may be sent with, for example, a request for a transcription of the utterance. For example, the client device 102 sends audio data 112 for the utterance 104 to the computing system 120. The audio data 112 may be, for example, a recording of the utterance 104, or information derived from the detected utterance 104, such as filterbank energy values, mel-frequency cepstral coefficients (MFCCs), or scores for other acoustic features.

The client device 110 may also send linguistic context data 114 that indicates a linguistic context for the utterance 104. For example, the client device 110 may provide data that indicates the words that the utterance 104 follows. In the illustrated example, the linguistic context data 114 indicates the words "Let's meet at" that immediately precede the utterance 104. In some implementations, the linguistic context data 114 provides a specific amount of text, for example, the previous one, two, three, five, or ten words, or the text recognized within a predetermined amount of time. The linguistic context may include words that were previously spoken by the user and are recognized, and/or text that was entered or accessed in another manner. For example, a user could open a text file, place a cursor at a particular position in the text, and begin speaking to insert additional text. Some amount of text before the cursor may be provided as linguistic context, regardless of how the text in the file was entered.

The client device 110 may also determine and send non-linguistic context data 116 to indicate a non-linguistic context for the utterance 104. The non-linguistic context data may indicate, for example, characteristics of the environment in which the utterance 104 is spoken. The non-linguistic context data 104 can indicate factors related to the physical environment of the user 102 or client device 110, such as geographical location, time, temperature, weather, or ambient noise. The non-linguistic context data 104 can provide information about the physical state of the client device 110, for example, whether the device 110 is moving or stationary, the speed of movement of the device 110, whether the device 110 is being held or not, a pose or orientation of the device 110, whether or not the device 110 is connected to a docking station, and/or the type of docking station to which the client device 110 is connected. The non-linguistic context data 104 can provide information about the operating state of the client device 110, for example, an identifier for an application running on the client device 110, or a category or classification for the application to which that the utterance 104 was provided as input. The non-linguistic context data 104 can also indicate information about the user 102 that spoke the utterance, for example, a user identifier, whether the user is male or female, or other information from a user profile for the user.

In the illustrated example, the client device 110 determines its location, for example, using a global positioning system (GPS) module or other techniques, and determines that the client device 110 is located in the city of Los Angeles. The client device 110 also determines that the utterance 104 was recorded as input to a mail application running on the client device 110. The client device 110 provides data indicating the location, e.g., "Los Angeles," and the active application, e.g., the "Mail" application, to the computing system 120 as non-linguistic context data 116. The client device also provides the audio data 112 and the linguistic context data 114 to the computing system.

During stage (C), the computing system 120 uses a speech recognizer module 130 to determine candidate transcriptions 135 for the utterance 104. The candidate transcriptions 135 may be provided as, for example, a list, a word lattice, or in other forms. The candidate transcriptions 135 may be scored or ranked to indicate which candidate transcriptions 135 the speech recognizer module 130 estimates to be most likely to be correct transcriptions. In the illustrated example, the candidate transcriptions 135 represent a set of highest ranking or most likely transcriptions, as estimated by the speech recognizer 130. This set can be an n-best list, including, for example, the top 3, 5, 10, 25, or other integer number of candidate transcriptions.

In some implementations, the speech recognizer module 130 uses an acoustic model and a language model to identify the candidate transcriptions 135. The models used by the speech recognizer module 130 may or may not use non-linguistic context data to determine candidate transcriptions. Accordingly, in some instances, the candidate transcriptions 135 may be determined based on the audio data 112 and the linguistic context data 114, without being influenced by the non-linguistic context data 116. Another language model may use information about the non-linguistic context to re-score or re-rank the candidate transcriptions 135 to improve accuracy. In some implementations, the speech recognizer module 130 may use the non-linguistic context data 116 to identify and/or score the candidate transcriptions 135.

During stage (D), the computing system 120 uses a feature extraction module 140 to determine scores 145 for various different features. For example, the feature extraction module 140 can determine which of various linguistic features and/or non-linguistic features should be set as being active for a particular utterance. An example of determining the scores 145 determined by the feature extraction module 140 is shown in FIG. 2.

Figure 2:
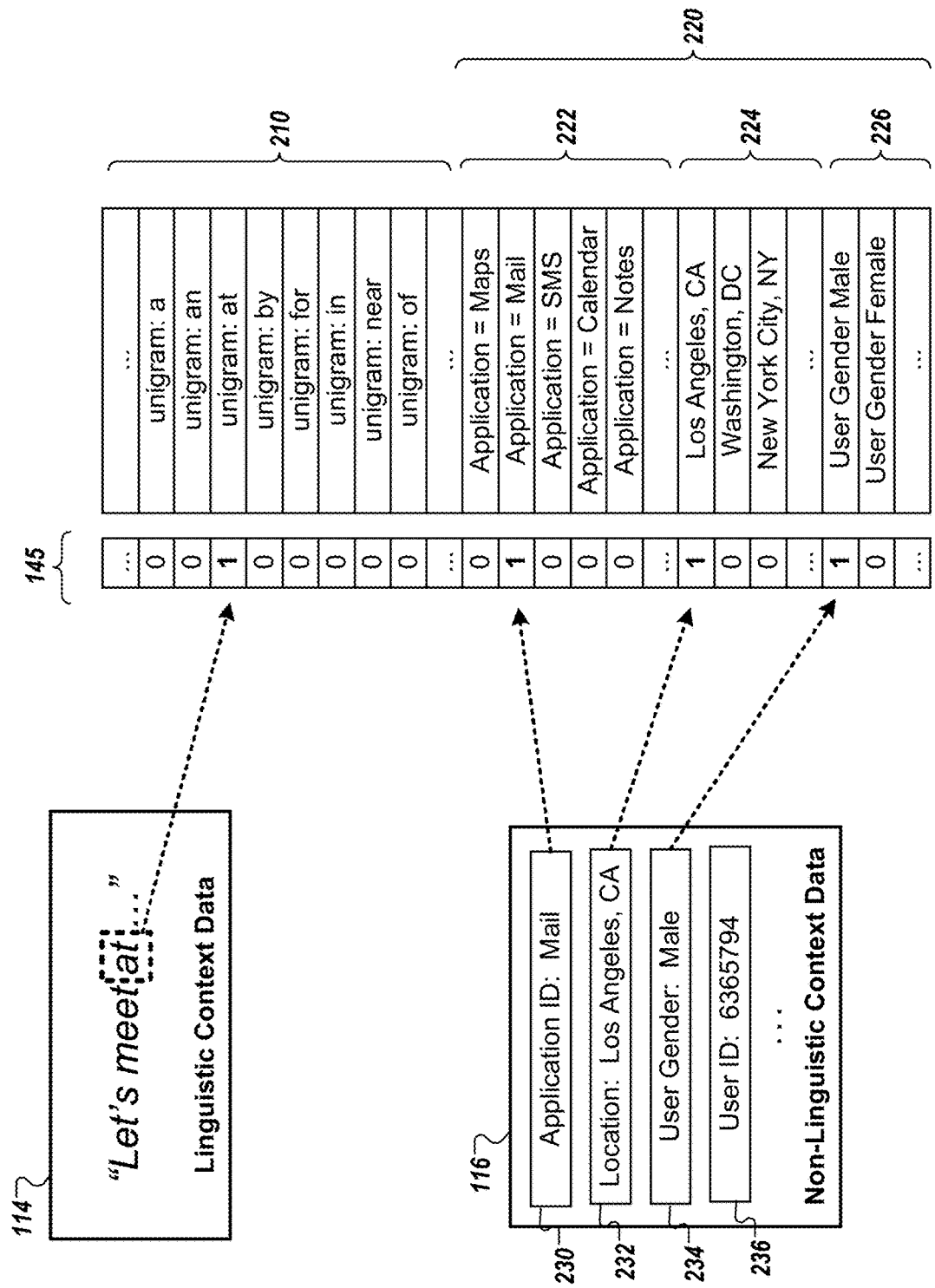
FIG. 2 is a diagram that illustrates examples of feature scores.

FIG. 2 is a diagram that illustrates examples of feature scores 145. The linguistic context data 114 can be used to determine scores for linguistic features 210. The non-linguistic context data 116 can be used to determine scores for non-linguistic features 220. In the example, each of the feature scores 145 is a binary value that indicates whether the corresponding feature describes the environment in which the utterance 104 is spoken. The feature scores can be organized as one or more feature vectors. In the example, scores for linguistic features 210 and scores for non-linguistic features 220 are included together in a context vector. The feature scores 145 may be determined based on information received from the client device 110, or from other information, such as information from other devices and information stored at or accessible to the computing system 120. The feature scores 145 may be values that correspond to a predetermined set of features used to train the language model 150. For example, each value in the vector can represent a score for a particular predetermined contextual feature, with the scores being arranged in the vector in the same order or arrangement that was used during training.

In the example, each of the feature scores 145 is a binary value, where a value of "1" indicates that the data from the client device 110 indicates that the feature corresponding to the feature score is likely part of the context for the utterance 104. A value of "0" may indicate that the corresponding feature is likely not part of the context in which the utterance 104 is spoken, or that sufficient information is not available to confirm whether the feature reflects the current context. Although the illustrated example uses binary values as feature scores 145, other values may be used. For example, different values may indicate different estimates or likelihoods that different features describe the current context.

The feature scores 145 include a score for each of a set of linguistic features 210, which can represent, for example, characteristics of text that the utterance 104 occurs after. For example, the scores for linguistic features 210 may indicate one or more words that occur in sequence prior to the words of the utterance 104. The linguistic features 210 may include n-gram features. For example, a unigram feature may indicate a whether a particular word occurs immediately before the words in the utterance 104. A bigram feature may indicate whether a particular sequence of two words occurs before the utterance 104. A trigram feature may indicate whether a particular sequence of three words occurs before the utterance 104. Scores may be determined for n-gram features for any appropriate value of n, and may include scores for multiple values of n, such as a combination of unigram, bigram, and trigram features. In some implementations, linguistic features may indicate other information regarding the lexical characteristics of prior words, such as the part of speech of one or more prior words, or whether a prior word includes a particular prefix, suffix, or other component.

In the illustrated example, each of the linguistic features 210 is a unigram feature, and the corresponding score indicates whether the indicated word is the word preceding the utterance 104. The feature score for the unigram "at" is set to a value of "1" to indicate that the word "at" occurs immediately before the position where the transcription of the utterance 104 will be entered. The scores for all other unigram features are set to "0," since none of these other words is the word that precedes the utterance 104. In some implementations, every word in a dictionary may correspond to a different unigram feature. In some implementations, unigram features for only a subset of recognized words may be used.

For n-gram features for values of n greater than one, each n-gram feature may represent a different combination of words. A different n-gram feature may be used for each word combination that occurs in a set of example text, or for each word combination that occurs with at least a minimum frequency in the example text. Given the linguistic context data 114, a bigram feature for the word sequence "meet at" would be set to a value of "1," and all other bigram features would be set to "0." Similarly, a trigram feature corresponding to the word sequence "let's meet at" would be set to "1," and all other trigrams would be set to zero.

The feature scores 145 can also include a set of scores for non-linguistic features 220, which can represent, for example, the physical environment in which the utterance 104 is spoken, or the operating state of the client device 110, or characteristics of the user 102, or other features other than words or phrases that the utterance 104 follows. The scores for the non-linguistic features 220 can be separate and independent from the text or spoken words that precede the utterance. Examples of non-linguistic features 220 include application features 222, location features 224, and user features 226.

The application features 222 may indicate characteristics of an application that is active on the client device 110, for example, the application to which the utterance 104 is provided as input. In the example, each of the application features 222 corresponds to a specific application, and the score indicates whether the application is active. The non-linguistic context data 116 can include an application identifier 230 for the active application. A predetermined set of applications can each have a different corresponding application identifier. In the example, the application identifier 230 indicates that a "Mail" application is active, so the score for the "Mail" application feature is set to "1." The scores for the other application features 222, which represent applications that are not indicated to be active, are set to "0." In some implementations, some application features 222 may indicate categories or classes of applications in addition to or instead of specific applications. For example, one application feature 222 may indicate whether the active application is a web browser, without indicating which particular web browser is used. Another application feature 222 may indicate whether the active application is classified as an e-mail application, without indicating which specific e-mail application is used.

The location features 224 may indicate a geographical location of the user and/or the client device 110. For example, different location features 224 may each indicate whether the client device 110 is located in a particular country, state, county, city, or other geographical region. In the example, each of the location features 224 indicates whether the utterance 104 is entered at a particular city. The non-linguistic context data 116 includes a location identifier 232 that indicates that the client device 110 is located in the city of "Los Angeles," so the score for the "Los Angeles" location feature is set to "1." Since the user 102 is not in any of the other cities, the remainder of the location features 224 are set to "0."

The user features 226 indicate characteristics of the user 102 that is believed to have spoken the utterance 104, e.g., a user that is logged in at the client device 110, or the owner of the client device 110. In the example, the user features 226 indicate whether the user 102 is male or female. The non-linguistic context data 116 indicates that the user 102 is male, and so the score for the "male" feature is set to "1." Other user features 226 may indicate other user attributes. In some implementations, the non-linguistic context data 116 includes a user identifier 236 that corresponds to the user 102. The user identifier 236 may be used to access a user profile, a search query history, or a browsing history for the user 102 to determine other scores. For example, in some implementations, user scores may indicate whether the user 102 has previously submitted a search query with certain words or phrases, or whether the user 102 has searched for or browsed web pages related to various topics. Various features may correspond to different categories or topics of searches, such as "sports," "shopping," "food," etc.

In some implementations, non-linguistic features 220 may indicate personalized information for a user 102, such as the names in a phone contact list or address book, names or numbers in a list of frequently called list, addresses stored as favorite locations, and so on. A client device 110 may provide, or the computer system 120 may store, information indicating names in the frequently called list or other data.

Other non-linguistic features 220 may additionally or alternatively be used. For example, some non-linguistic features could each correspond to a domain name, e.g., "example.com," and the scores may indicate whether the user is currently visiting a web page in the indicated domain. As another example, non-linguistic features may indicate an operating system running on the client device 110, or a device type of the client device 110, e.g., tablet computer, phone, laptop computer, etc. As another example, non-linguistic features may indicate a type of input field that the transcription of the utterance 104 will be entered into, e.g., whether the input field accepts an address, a name, a phone number, an e-mail address, a URL, a search query, etc. As another example, some non-linguistic features may indicate a task that a user is performing, such as dictating, composing a message, or shopping. In some implementations, non-linguistic context may include any information about the user 102, the client device 110, or the environment in which the utterance 104 is made, other than information that describes or is derived from the words that precede the utterance 104.

Referring again to FIG. 1, during stage (E), the feature scores 145 are provided as input to a language model 150. Based on the feature scores 145, the language model 150 provides a set of output values 155, which may indicate likelihoods that one or more words will occur in the current context. The language model 150 can be a model that has been trained to estimate the likelihood of a word or phrase occurring based on scores for linguistic and/or non-linguistic features. For example, the language model 150 can determine a posterior probability of a current word, e.g., the first word of the utterance 104, given information about the context for the utterance 104, which may include linguistic context, e.g., the prior words "Let's meet at," and/or non-linguistic context, e.g., location, device state, application, user characteristics, etc. The features used to train the language model 150 can be the same linguistic features 210 and non-linguistic features 220 corresponding to the feature scores 145. In other words, the feature scores 145 are determined in stage (D) for the features that the language model 150 was trained to be able to process and use to determine word likelihoods.

The language model 150 may include a set of internal weights that represent the training state of the language model 150. These weights may indicate how various aspects of context make words more or less likely to occur. Typically, the weights in the language model 150 are set during training of the language model 150 and do not change during use of the language model. However, the weights are trained using examples of input from a variety of different users and different environments, so the language model 150 is able to estimate likelihoods of words occurring given many different types of linguistic and non-linguistic contexts.

In some implementations, the language model 150 is a log-linear model. Log-linear models may effectively take into account scores from large numbers of features and scores for features of multiple different types. For example, a log-linear model may be used to combine word n-gram feature scores with feature scores indicating physical environment, user characteristics, and other factors. In some implementations, log-linear models may provide greater efficiency or smaller storage requirements than, for example, hidden Markov models (HMMs) or other statistical models.

In some implementations, the language model 150 may be a maximum entropy model. Other types of models and other training techniques may additionally or alternatively be used. For example, support vector machines, neural networks, classifiers, and other types of models may be used to process various contextual features, including linguistic feature scores, non-linguistic feature scores, and/or other types of information. As an example, an integrated circuit or other device could implement a neural network to serve as a language model. As another example, a set of multiple classifiers could each be trained to process one or more feature scores, and a system could combine the outputs of the classifiers to indicate a probability of occurrence of a word or other lexical item. In general, any appropriate model may be used, where the model receives values for contextual features and provides output indicative of a likelihood of occurrence of a word based on the received values.

During training of the language model 150, as discussed further below, various weights or other parameters within the language model 150 can be set to indicate the impact that various feature scores have on the likelihood of a word occurring. For example, the language model 150 may be trained with data indicating that users have frequently entered names of locations, e.g., "gas station," "theater," and "school," in a navigation application. The trained language model 150 may include weights so that when the feature scores 145 indicate that the user is using the navigation application, the language model 150 indicates an increased likelihood that the location names previously used in the navigation application may occur in the speech of the user 102. That is, when the navigation application is used, the likelihood that the language model 150 indicates for a word such as "theater" may be higher than the likelihood indicated if the user is not using the navigation application. As another example, training data may indicate which words are spoken most frequently at different locations, and the weights within the language model 150 can adjust for differences in likelihoods between different locations. When the location of the user 102 is indicated in the features scores 145, weights within the language model 150 can increase the likelihood for words frequently spoken at the user's location, and can decrease the likelihood for words infrequently spoken or not spoken at the user's location. As another example, since men and women may use certain words with different frequencies, the language model 150 may include weights that take into account the gender of the user 104 in estimating which word occurs in a sequence.

The output values 155 provided by the language model 150 may be, for example, scores indicating likelihoods of occurrence of different words given the context indicated by the feature scores 145. For example, the language model 150 may indicate a posterior probability P(y|X), or values from which the probability may be determined, where y represents a lexical item, such as a word, number, URL, or other lexical item, and X is a vector including the feature scores 145. The training of the language model allows the language model 150 to use the various feature scores to adjust probabilities according to the situation of the user 102. For example, the probability that a word is the name "Mike" may be greater if the feature scores 145 indicate that the name "Mike" is in the user's frequently called list than if the name is not in the list. As another example, the name of an athlete may be indicated to be more likely if the feature scores 145 indicate that one or more of the user's prior searches relate to the topic of sports than if prior searches are not related to the topic of sports. As another example, business names and addresses that are near the user 102 or were spoken by others near the location of the user 102 may have a higher probability than if the business names and addresses that are far from the location of the user 102 or are not frequently used by other users at the location of the user 102.

In some implementations, the language model 150 outputs a score for each of multiple words, for example, each of the different words at the beginning of the candidate transcriptions 135, e.g., "hair," "her," and "Hermosa." The computing system 120 may then use the language model 150 to determine scores for the next words that occur in the candidate transcriptions, e.g., a score for "mousse" occurring after "hair," a score for "mouse" occurring after "her," a score for "mouse" occurring after "her," and so on. For these additional words, the linguistic context has changed, e.g., "Let's meet at hair" rather than "Let's meet at." To reflect the updated linguistic context, the computing system 120 may use the feature extraction module 140 to determine a new set of feature scores that are appropriate for the new context. In this manner, the computing system 120 may use the language model 150 to determine a score for each of the words in each of the candidate transcriptions 135, based on the particular words that each word follows and the non-linguistic context.

Typically, the environment in which the user 102 speaks does not change mid utterance, and so scores for non-linguistic features may remain the same for each word in the candidate transcriptions 135 in some instances. However, if factors such as location, the application in which a user is speaking, the field in which input is entered, or other contextual aspects change during dictation, the scores for non-linguistic features may be updated to reflect the different environment in which different words were entered. The client device 110 may provide updated non-linguistic context data when the non-linguistic context changes, and the computing system 120 may associate different non-linguistic contexts with different utterances or different portions of an utterance.

During stage (F), the computing system 120 uses a re-scoring module 160 to determine scores 165 for the different candidate transcriptions 135. For example, based on outputs from the language model 155 for each of the different words of the candidate transcriptions 135, the re-scoring module 160 determines a score 165 indicating a likelihood of occurrence of each candidate transcription 135 as a whole. For example, for the first candidate transcription, the re-scoring module may combine scores 155 from the language model 150 for the individual words "hair," "mousse," and "beach" to determine an overall score for the phrase "hair mousse beach."

During stage (G), the computing system 120 selects a transcription for the utterance 104 based on the scores 165. For example, the computing system 120 may select the candidate transcription 135 having the score 165 that indicates the highest likelihood of occurrence.

In the illustrated example, the output of the language model 150 indicates that the phrase "Hermosa beach" is the candidate transcription 135 that is most likely to be correct. Although the initial ranking of the candidate transcriptions 135 did not indicate it to be the most likely transcription, the use of non-linguistic context data 116 allows the language model 150 to more accurately estimate the likelihood that it is the correct transcription. "Hermosa beach" is the name of a place near Los Angeles, and training data for the language model 150 indicated that users in Los Angeles are more likely than users at other places to say the phrase. Accordingly, the training for the language model 150 was trained "Hermosa beach" and other words spoken in Los Angeles a higher likelihood when a user is located in Los Angeles. Because the non-linguistic context data 116 indicated that the user 102 is located in Los Angeles, the language model 150 provided output indicating "Hermosa beach" has a high likelihood of being correct.

During stage (H), the computing system 120 provides the selected transcription to the client device 102. The client device 102 may insert the transcription in the application that is running, to complete the user's intended phrase, "Let's meet at Hermosa beach."

In the example shown in FIG. 1, non-linguistic context data is used to re-score candidate transcriptions 135 that were determined without taking into account non-linguistic context data. In some implementations, the speech recognizer 130 may use a language model, such as the language model 150, that uses non-linguistic context data to select and rank the candidate transcriptions. In these implementations, a separate re-scoring process may not be needed.

In some implementations, the input to the language model 150 may include only feature scores for non-linguistic features. In other implementations, as shown in FIGS. 1 and 2, feature scores may be provided for both linguistic and non-linguistic features. In some implementations, a language model that determines likelihoods using both linguistic and non-linguistic features may have better accuracy than a language model that provides scores based on only linguistic features or only non-linguistic features.

Figure 3A:
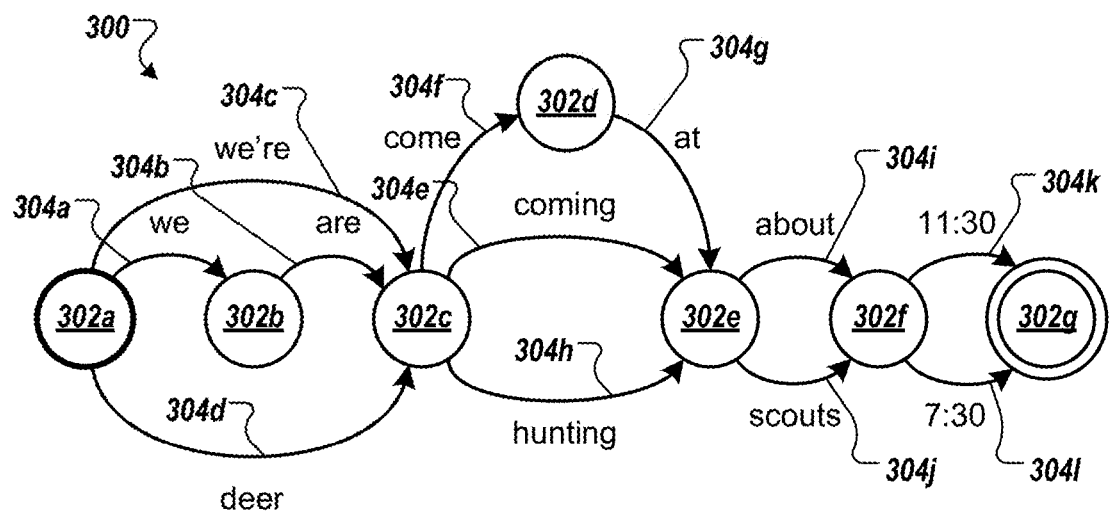
FIGS. 3A and 3B are diagrams that illustrate examples of word lattices.

FIG. 3A is an example of a word lattice 300 that may be provided by a speech recognizer system, such as the speech recognizer module 130 of FIG. 1. The word lattice 300 represents multiple possible combinations of words that may form different candidate transcriptions for an utterance.

The word lattice 300 includes one or more nodes 302a-302g that correspond to the possible boundaries between words. The word lattice 300 includes multiple edges 304a-304l for the possible words in the transcription hypotheses that result from the word lattice 300. In addition, each of the edges 304a-304l can have one or more weights or probabilities of that edge being the correct edge from the corresponding node. The weights are determined by the speech recognizer module system and can be based on, for example, a confidence in the match between the speech data and the word for that edge and how well the word fits grammatically and/or lexically with other words in the word lattice 300.

For example, initially, the most probable path through the word lattice 300 may include the edges 304c, 304e, 304i, and 304k, which have the text "we're coming about 11:30." A second best path may include the edges 304d, 304h, 304j, and 304l, which have the text "deer hunting scouts 7:30."

Each pair of nodes may have one or more paths corresponding to the alternate words in the various candidate transcriptions. For example, the initial most probable path between the node pair beginning at the node 302a and ending at the node 302c is the edge 304c "we're". This path has alternate paths that include the edges 304a-304b "we are" and the edge 304d "deer".

Weights for the edges 304a-304l may be determined using a language model that takes into account non-linguistic context. For example, a language model such as the language model 150 of FIG. 1 may be used to determine weights for each edge using information about, for example, a location an utterance was spoken, an application used, the user that spoke the utterance, or other non-linguistic context. The new or revised weights may be replace or be combined with, e.g., averaged or otherwise interpolated, with the initial weights for the edges 304a-304l. The re-scored lattice may then be used to select a transcription. Alternatively, a language model that uses non-linguistic context data may be used to determine the initial weights for the edges 304a-304l.

Figure 3B:
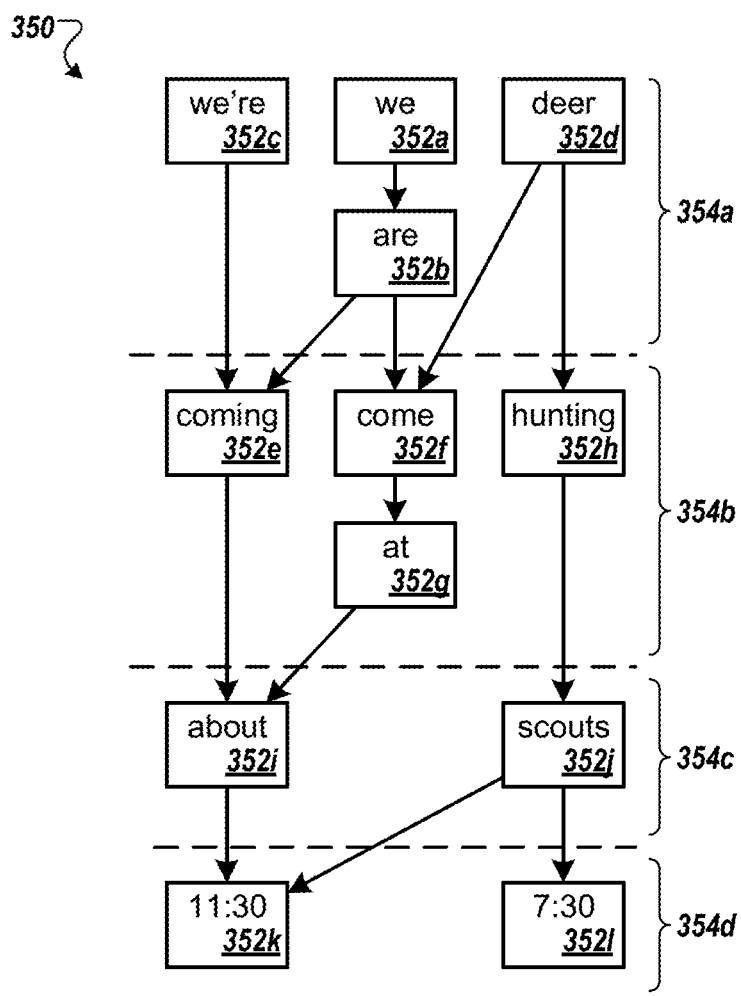

FIG. 3B is an example of a hierarchical word lattice 350 that may be provided by a speech recognizer system. The word lattice 350 includes nodes 352a-352l that represent the words that make up the various candidate transcriptions for an utterance. The edges between the nodes 352a-352l show that the possible candidate transcriptions include: (1) the nodes 352c, 352e, 352i, and 352k "we're coming about 11:30"; (2) the nodes 352a, 352b, 352e, 352i, and 352k "we are coming about 11:30"; (3) the nodes 352a, 352b, 352f, 352g, 352i, and 352k "we are come at about 11:30"; (4) the nodes 352d, 352f, 352g, 352i, and 352k "deer come at about 11:30"; (5) the nodes 352d, 352h, 352j, and 352k "deer hunting scouts 11:30"; and (6) the nodes 352d, 352h, 352j, and 352l "deer hunting scouts 7:30".

Again, the edges between the nodes 352a-352l may have associated weights or probabilities based on the confidence in the speech recognition and the grammatical/lexical analysis of the resulting text. The weights for the edges between the nodes 352a-352l may be determined using information about non-linguistic context. In some implementations, a second set of weights may be determined to update initial weights with weights based on non-linguistic context.

In this example, "we're coming about 11:30" may currently be the best hypothesis and "deer hunting scouts 7:30" may be the next best hypothesis. One or more divisions 354a-354d can be made in the word lattice 350 that group a word and its alternates together. For example, the division 354a includes the word "we're" and the alternates "we are" and "deer". The division 354b includes the word "coming" and the alternates "come at" and "hunting". The division 354c includes the word "about" and the alternate "scouts" and the division 354d includes the word "11:30" and the alternate "7:30".

Figure 4:
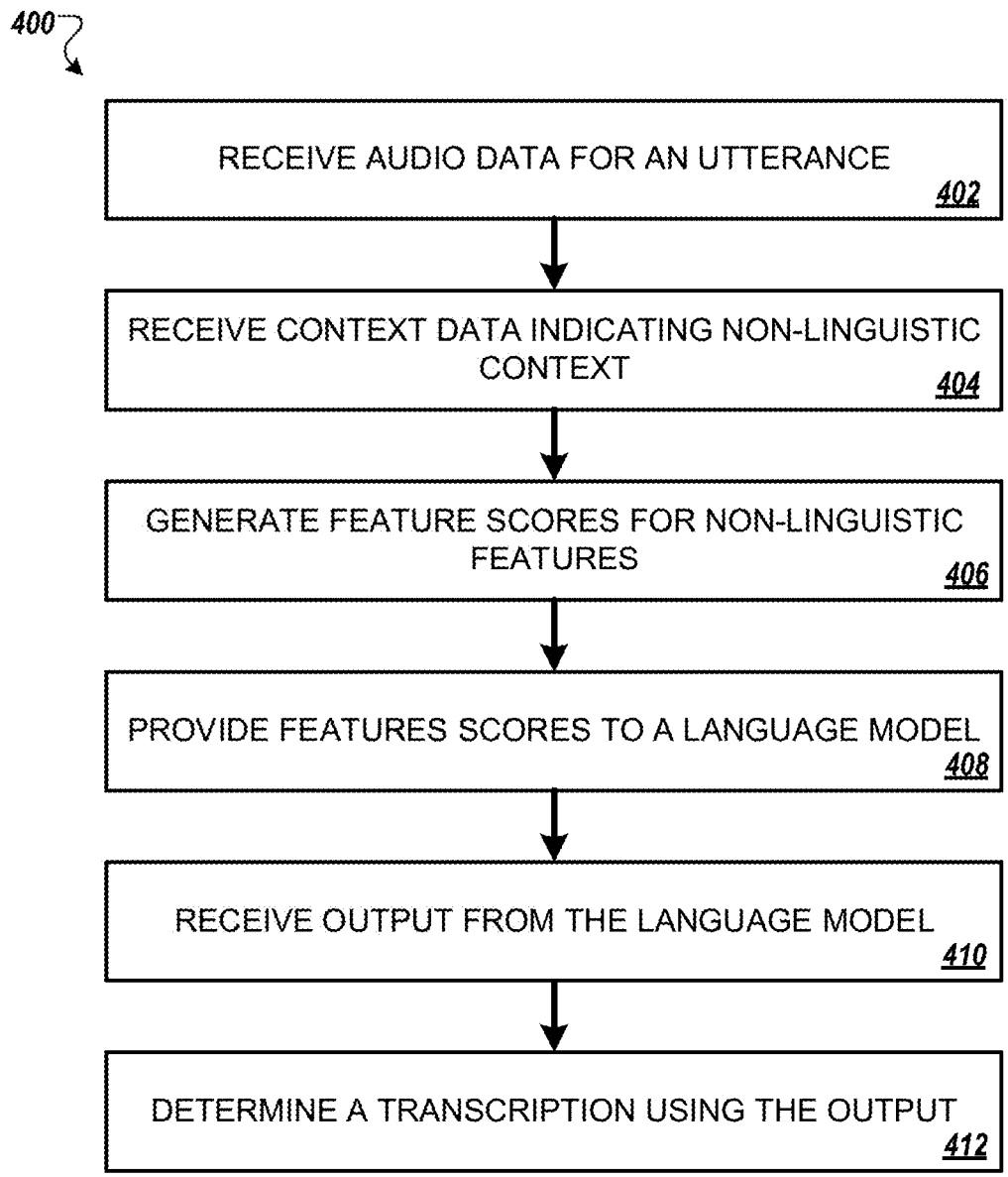
FIG. 4 is a flow diagram that illustrates an example of a process for using a language model that uses non-linguistic context.

FIG. 4 is a flow diagram that illustrates an example of a process 400 for using a language model that uses non-linguistic context. The process 400 may be performed by the computing system 120 of FIG. 1 or another system or device.

Audio data indicating characteristics of an utterance is received (402). For example, the audio data may include recorded audio including the utterance. As another example, the audio data may include scores for acoustic features that represent acoustic characteristics of the utterance.

Context data indicating non-linguistic context of the utterance is received (404). The context data may indicate, for example, a location the utterance was received, an application that is active on a device that detected the utterance, information about a user of the device that detected the utterance, personalized information stored on the device, such as calendar entries or a list of people called, or other information.

Scores for one or more non-linguistic features are generated based on the context data (406). As an example, the context data indicates an application through which the utterance is entered, or that the application belongs to a particular class or category. For example, to determine an application feature, an application identifier for an active application may be accessed, a feature corresponding to the application may be identified, and a feature score may be determined to indicate that the application is active. Feature scores may indicate whether the utterance is entered using a particular application or an application in a particular class of applications. As another example, the context data may indicate a gender of a speaker of the utterance, and the feature scores indicate the gender of the speaker. As another example, the context data may indicate a geographical location where the utterance was spoken, and the feature scores may indicate the geographical location. The context data may indicate names in a contact list or list of calls made or received, and the feature scores may indicate the names in the list. The context data may indicate a task that the user is performing, such as dictating, entering a URL, composing a message, entering an address, entering a query, etc., and the feature scores can indicate the task. The context data may indicate a type of input field that is active, and the features scores may indicate which type of input field is active. The context data may indicate one or more topics of prior searches or web browsing of the user, and the feature scores may indicate the one or more topics. Alternatively, the context data may provide a user identifier, such as a user account name or a value from a cookie, and a topic of prior searches or web browsing may be accessed from query or browsing logs using the user identifier. The context data may indicate a physical state of a device that detects the utterance, such as whether the device is moving, is held in a particular orientation, etc., and the context data may indicate the physical state of the device.

In some implementations, the feature scores are binary values that indicate whether a particular aspect of non-linguistic context describes the context in which the utterance is entered. For example, a different feature score may be determined for each of a set of applications. For each application, a binary value may be determined to indicate whether the utterance was entered using that particular application. Similarly, a different feature score may be determined for each of a predetermined set of locations, to indicate whether the utterance was spoken at the corresponding location.

The scores for the non-linguistic features are provided to a log-linear language model (408). The language model may be trained to process scores for non-linguistic features. For example, the language model may be trained to estimate likelihoods that a word occurs in a sequence of words based at least in part on scores for non-linguistic features. The language model may be trained based on text entered by multiple different users in various different contexts, e.g., users using different applications, users in different locations, users having different characteristics, and/or users performing different tasks.

Output from the log-linear language model is received (410). For example, the output may include a score for a word, where the score indicates an estimated likelihood that the word occurs given the non-linguistic features provided as input to the language model. The output may be based on input to the language model that indicates linguistic context for the utterance, for example, one or more words that precede the utterance A transcription for the utterance is determined using the output of the log-linear language model (412). The output of the log-linear language model may be used to score one or more transcriptions, and a transcription may be selected based on the scores.

In some implementations, a set of candidate transcriptions, e.g., an n-best list, for the utterance is received, and scores for each of the candidate transcriptions in the set are determined based on the output of the log-linear language model. One of the candidate transcriptions may be selected based on the scores for the candidate transcriptions.

In some implementations, a word lattice indicating candidate transcriptions for the utterance is received. Scores corresponding to elements of the word lattice may be determined based on the output of the log-linear language model, and a transcription for the utterance may be selected based on the scores corresponding to elements of the word lattice.

In some implementations, data can be received that indicates a linguistic context for the utterance, e.g., one or more words occurring before the utterance. Feature scores may be determined for one or more linguistic features based on the data indicating the linguistic context. For example, word n-gram scores may be determined based on one or more words spoken or otherwise entered prior to the utterance. The scores for the one or more linguistic features may be provided to the log-linear language model. In some implementations, scores for linguistic features and non-linguistic features are provided together, for example, as part of the same vector of feature scores. The output received from the log-linear language model can be based on (i) the scores for the non-linguistic features and (ii) the scores for the linguistic features. For example, for a given word, the output may include a score that indicates likelihood of occurrence of the word given both the scores for the linguistic features and non-linguistic features.

Figure 5:
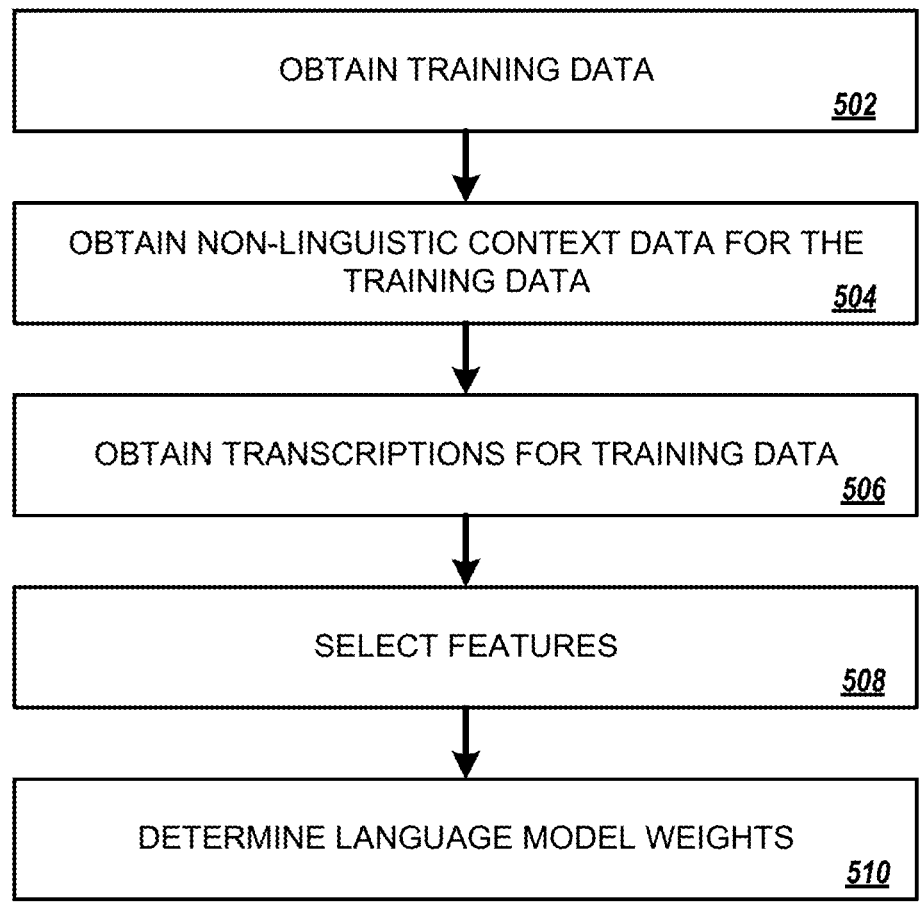
FIG. 5 is a flow diagram illustrating an example of a process for training a language model.

FIG. 5 is a flow diagram illustrating an example of a process 500 for training a language model. The process 500 may be performed by one or more computing systems.

Training data for training a language model is obtained (502). In some implementations, unsupervised user input is collected from different users. To train a language model for use in speech recognition, spoken inputs may be collected from various users and used as training data. For example, the training data may include utterances entered by different users over the normal course of using various applications or performing various tasks. In some implementations, the training data may include data entered through multiple input modalities, including, for example, spoken input, typed input, or other forms of input.

Non-linguistic context data for the training data is obtained (504). For example, the non-linguistic context data can be metadata or other information that indicates characteristics of the environment in which the utterances or text samples in the training data were entered. The non-linguistic context data may indicate, for example, which applications users used to enter their utterances. As another example, the non-linguistic context data may indicate a location of a user or a device when utterances were spoken. Different contextual information may be available for different portions of the training data. For example, the application used may be known for some training data and not for other training data.

In some implementations, it may be advantageous to use at least some training data where some non-linguistic context is not indicated, which may improve robustness and accuracy when the model is used with inputs that do not provide non-linguistic context data. For example, some training data may not have any corresponding application identified, and so examples for training may have no application identified. Those examples may help the training process create model weights that can accurately provide estimates for input sets that do not indicate an application.

Transcriptions are generated for the training data (506). In some implementations, an automatic speech recognizer may be used to determine likely transcriptions for utterances in the training data. In some implementations, transcriptions may be determined from logs of previously transcribed inputs.

A set of features are selected (508). The features may include linguistic features and non-linguistic features. The linguistic features may include, for example, word n-gram features. In some implementations, a different unigram feature may be used for each word in a vocabulary used to train the language model. Bigram features, trigram features, or other n-gram features may also be selected. For example, an n-gram feature may be selected for each n-gram that occurs in the training data at least a predetermined number of times.

The non-linguistic features may indicate, for example, different applications, locations, user attributes, or any other appropriate aspects of non-linguistic context. For example, the training data may be evaluated to determine the most frequently used applications. A different feature may be selected to represent each of a predetermined number of the most frequently used applications, e.g., the 25, 50, or 100 most commonly used applications. As another example, the most frequent locations indicated by the non-linguistic context data may be identified. A different feature may correspond to each city within the set of most frequent locations. In a similar manner, sets of features, which may be binary features, may be selected for all appropriate contextual factors that the model will be trained to use.

In some implementations, the features used to train a language model and to provide as input to a trained model may indicate the presence of two or more contextual factors. For example, a feature could indicate the presence of two different non-linguistic factors, e.g., a value of "1" for a single feature could indicate (i) that an application identifier corresponds to a mail application and (ii) that the user is in New York City. A feature could represent a combination of a particular linguistic factor together with a non-linguistic contextual factor. For example, a single feature could correspond to the prior word spoken being "park" and the current application being a map application. Other combinations of contextual information in features, including features representing three or more aspects of linguistic and/or non-linguistic context may be used.

Referring again to FIG. 5, language model weights or other parameter values are determined (510). From the training data, feature vectors are determined. For example, from an utterance transcribed as "the cat is black," one feature vector may indicate the occurrence of the word "the" at the beginning of a phrase, another feature vector may indicate the occurrence of "cat" after the word "the," another feature vector may indicate the occurrence of the word "is" after the word "cat," and so on. Each feature vector includes feature scores for all of the selected features to indicate the context in which the word occurred. A different example feature vector may be determined for each transcribed word in each utterance instance in the set of training data.

Using the feature vectors extracted from the training data, the model is trained to model the probability distribution of the word occurrences in the training data. For example, a log-linear model may be trained using a stochastic gradient descent technique using characteristics of the training data. The posterior probability distribution of the training data may be modeled directly, using unsupervised spoken data, such as output of a speech recognition system, and/or data typed by users.

Figure 6:
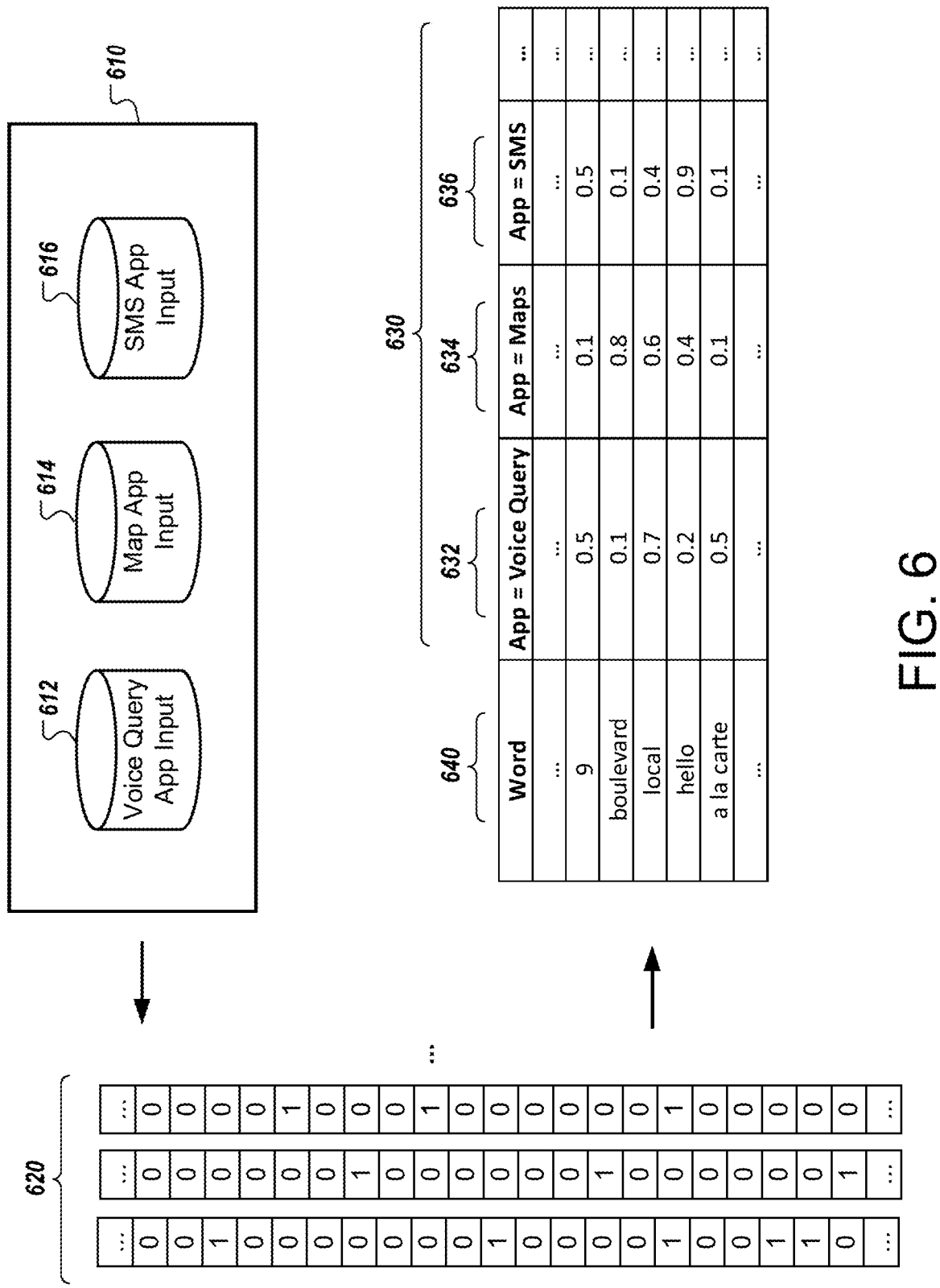
FIG. 6 is a diagram illustrating examples of scores used for training a language model.

In some implementations, a different weight is included in the language model for each word in the vocabulary of the language model with respect to each one of the selected features. For example, if a language model has a vocabulary of 10,000 words and 15,000 contextual features were selected, the total number of weights in the language model would be 10,000*15,000=150,000,000 weights. As a result, the effect of any of the selected features with respect to any of the words in the vocabulary may be determined. In some implementations, the language model may include fewer weights, for example, to reduce space or computation requirements, or to remove weights for unlikely words or unlikely combinations of words and contexts. An example of weights of a language model is shown in FIG. 6.

In some implementations, a plurality of different models may each be trained in parallel using different subsets of the training data. The parameters of the various models may be adjusted in various iterations. In some implementations, the models may be adjusted using various examples from the training data until the parameters converge, reach a threshold level of similarity, or meet other desired criteria. The weights of different models may be combined, e.g., averaged, at one or more iterations until a final set of weights for the model is determined.

In some implementations, a log-linear model is trained to provide a probability of occurrence any particular word, y, in a vocabulary given a vector of input feature scores, x, and using the language model weights, w, determined during training of the language model. The probability may satisfy Equation (1), below:

$$P(y \mid x; w) = \frac{\exp^{(w*f(x,y))}}{\sum_{y' \in Y}(\exp(w*f(x, y')))} \quad (1)$$

In Equation (1), Y is a finite set of lexical items such as the set of words or other lexical items in the vocabulary, y is a particular item from the set Y, x is a feature score vector indicating the feature scores for a particular context, w is a parameter vector indicating weights of the trained language model, and f(x, y) is a function that maps a combination of a lexical item and context to a vector.

In some implementations, the output of the function f(x, y) represents the set of input feature scores, x, concatenated or otherwise combined with one or more scores that indicate which lexical item, y, is being predicted. For example, a second vector can be determined so that it includes a score of "1" for the lexical item for which the probability estimate is desired, and a score of "0" is included for every other lexical item in the vocabulary of the language model. The second vector may be combined with the feature score vector, x, to form the output vector of function f(x, y). Other techniques for the function f(x, y) may additionally or alternatively be used. In some implementations, the output of the function f(x, y) may include a value corresponding to each weight in the language model. For example, the output vector may include a score for the particular word to be predicted with respect to each linguistic and non-linguistic feature, and a score of zero for every other word in the vocabulary with respect to every linguistic and non-linguistic feature.

As discussed above, other types of models besides log-linear models may additionally or alternatively be used. For example, the process 500 may be used to train a support vector machine, a neural network, one or more classifiers, or another type of model, using appropriate training algorithms.

FIG. 6 is a diagram illustrating aspects of training a language model. In the example, a set of training data 610 includes voice query application user input 612, map application user input 614, and SMS application user input 616. The training data 610 is transcribed, and feature score vectors 620 are generated to represent examples of word usage in the training data 610. For example, each feature score vector 620 may represent a particular instance of a word occurring in a particular utterance. Each feature score vector 620 may include a score to indicate the particular word that the feature score vector 620 represents, as well as contextual feature scores for linguistic features, e.g., indicating one or more preceding words, and scores for non-linguistic features, e.g., indicating a location, application, user attribute, or other context.

During training of the language model, the various examples of language usage indicated by the feature score vectors 620 are used to determine weights 630 for the language model. The weights are set through one or more training algorithms, which may optimize the weights to reflect the frequency that combinations of words and contexts occur in the training data 610.

In the example, the language model is trained to recognize lexical items in a vocabulary 640. The items in the vocabulary 640 may be numbers, individual words, phrases of multiple words, components or sub-parts of words, or other items. A weight may be determined for each item in the vocabulary 640 with respect to each contextual feature that the language model uses to estimate likelihoods.

For example, for each particular word in the vocabulary 640, there may be a different weight corresponding to the occurrence of the particular word after each word in the vocabulary 640. For example, for the word "local," one unigram weight may indicate if "cat" occurred immediately after the word "a"; another unigram weight may indicate if "cat" occurred immediately after the word "at"; and so on, so that there is a different weight to indicate likelihoods that "cat" occurs after each of the lexical items in the vocabulary 640. The weights may be determined based on occurrences of words in in any portion of the training data, regardless of the different environments or applications that were used. Weights may similarly be determined for bigram features, trigram features, or other linguistic features.

Similarly, there may also be a different weight 630 for each lexical item in the vocabulary 640 with respect to each non-linguistic contextual feature, such as each different location, or each different application, etc. For example, weights for a voice query application feature 632 indicate how likely each of the respective words in the vocabulary 640 is to occur in a voice query application. Weights for a map application feature 634 indicate how likely each of the respective words in the vocabulary 640 is to occur in a map application. Weights for a SMS application feature 634 indicate how likely each of the respective words in the vocabulary 640 is to occur in a SMS application. Weights may be determined for each of the other applications or classes of applications that the model is trained to use in predicting likelihoods. Weights may be determined for each of the other features selected for the model.

In some implementations, weights may be assigned for phrases of more than one word and various contextual factors. For example, the column 620 may include vocabulary entries that are phrases including two or more words. As a result, a weight value could represent a weight for "good Boston restaurants" occurring where the location is "Massachusetts."

Figure 7:
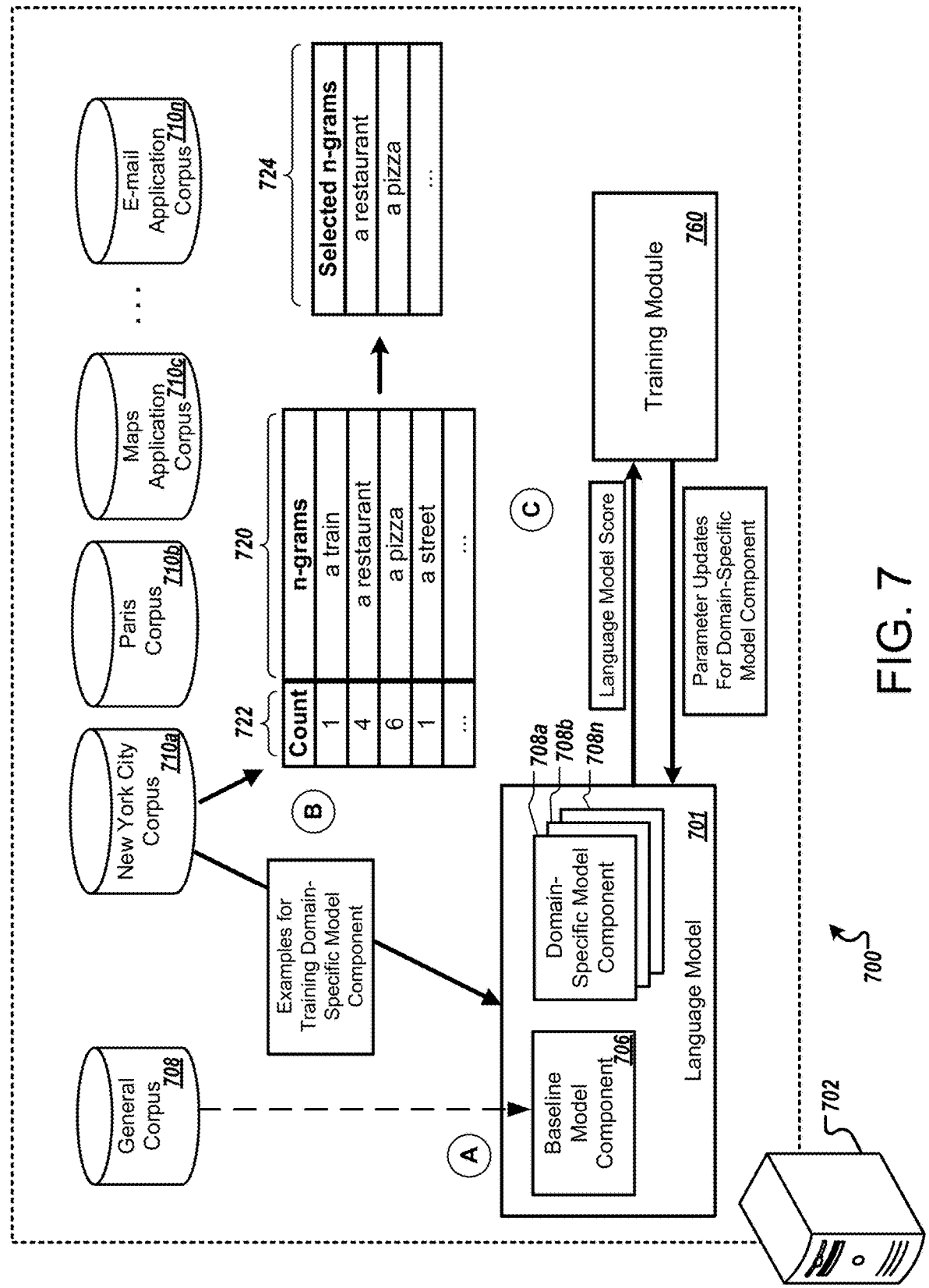
FIG. 7 is a diagram that illustrates an example of a system for generating a language model that has domain-specific model components.

FIG. 7 is a diagram that illustrates an example of a system 700 for generating a language model 701 that has domain-specific model components. In the example, the system 700 includes a computing system 702 that generates the language model 701, which includes a baseline model component 706 and multiple domain-specific model components 708a-708n. The computing system 702 accesses several groups of training data, e.g., a general corpus 708, and domain-specific corpora 710a-710n. The computing system 702 uses a training module 760 to update the parameters of the language model 701. The functions performed by the computing system 702 can be performed by individual computer systems or can be distributed across multiple computer systems. FIG. 7 shows a series of stages labeled (A) to (C) which show a flow of data.

In stage (A), the computing system 702 generates the baseline model component. The baseline model component can be a log-linear model trained using stochastic gradient descent (SGD). The baseline model component includes features corresponding to n-grams from the general corpus 708, which includes examples of language sequences. The examples in the general corpus 708 are typically not labeled with any non-linguistic context, and so represents a large set of domain-independent data. In some implementations, the general corpus 708 includes a large amount of examples such as voice search queries, text from dictation, and/or web documents or other text. The corpus 708 may include examples from a broad set of different sources.

For example, to generate the baseline language model component, n-grams in the general corpus 708 are identified. Features corresponding to the n-grams are defined for the baseline model component, so that the baseline model component has a log-linear model weight for each feature. The values of the weights are then updated using SGD training, for example, until a desired level of accuracy of the baseline model component is achieved. Through this process, the baseline model component is trained to determine language model scores independent of non-linguistic context information.

In stage (B), the computing system 702 determines feature sets for the domain-specific model components 710a-710n. Each of the domain-specific model components 710a-710n has a corresponding domain. The domains represent different aspects of non-linguistic context. For example, different domains may represent different locations where a user may be located, with one domain representing New York City, another domain representing Paris, another domain representing San Francisco, and so on. As another example, domains may represent particular applications running on a device that receive spoken input, for example, one domain represents a maps application used for navigation, another domain represents an e-mail application, and so on. Other examples of domains include different dialects that a user may speak, whether the user is in a vehicle, and the day of the week or time of day. The domains may represent any appropriate type of non-linguistic context, such as location, time, weather, device status, movement status, a user characteristic, a device characteristic, or others. A domain may also represent a combination of multiple aspects of non-linguistic context, e.g., a user in New York City on a weekend.

To train one of the domain-specific model components 708a-708n, the computing system 702 accesses training data that includes examples of language sequences that occur in the domain of the model component to be trained. For example, to train model component 708a as a domain for a speaker located in New York City, the corpus 710a containing input that users provided while in New York City is accessed. This corpus 710a can include queries, dictations, or other user inputs that have been labeled as being entered in New York City. As an example, the corpus 710a may include a set of queries submitted during a certain time range, such as the previous three months, by users located in New York City. In some implementations, the computing system 702 identifies the examples for a particular corpus by selecting language sequences from a log or other source that have been tagged or labeled as occurring in the particular domain.

The computing system 702 identifies n-grams 720 that occur in the corpus 710a for the domain of the model component being trained. For example, to train the model component 708a for the New York City domain, the computing system 702 may identify all of the unigrams and bigrams that occur in the examples in the New York City corpus 710a. The computing system 702 also determines a count 722 of how many times each n-gram occurs in the corpus 710.

From the identified n-grams 720, the computing system 702 selects a subset to use in the model component 708a for the New York City domain. For example, the computing system 702 may apply a threshold to select only the n-grams 724 that occur at least twice in the corpus 710a. Other thresholds may alternatively be used to filter the n-grams 720. By applying a minimum threshold and selecting only a subset of the n-grams 720, the domain-specific model component 708a is focused on the words and phrases that are most likely to be relevant to the domain and also have sufficient training examples for weights to be trained.

The selected n-grams 724 are used to define the features of the model component 708a. A separate model feature may be defined for each selected n-gram 724. In the illustrated example, one bigram feature may be defined to represent the occurrence of the phrase "a restaurant" being entered in New York City, and another bigram feature may be defined to represent the occurrence of the phrase "a pizza" being entered in New York City.

The model component 708a includes a parameter, such as a log-linear model weight, corresponding to each feature of the model component 708a. The parameters are all initialized at zero, so that the model component 708a initially has no influence on the output of the language model 701. Generating a language model score in this state would generate the output of the baseline model component alone, even when the model component 708a is used. Thus, before training of the parameters of the domain-specific model components 708a-708d, the language model 701 performs identically to the baseline model component.

The techniques for identifying n-grams, selecting a subset of n-grams, and establishing model parameters can be performed for each domain-specific model component 708a-708n, using its own corresponding corpus 710a-710n. The n-gram features of each domain-specific model component 708a-708n are selected independently, from different combinations of training data specific to each domain. Through this process, a different set of n-grams can be selected for each domain. As a result, each domain-specific model component 708a-708n can include weights for different n-gram features. The n-gram features in each domain-specific model component 708a-708n are generally far fewer in number than the number of n-gram features of the baseline model component. This allows the domain-specific model components 710a-710n to be trained with much less training data, and also reduces the size of the resulting language model 701.

In stage (C), the computing system 702 trains the domain-specific model components 708a-708n. Each domain-specific model component 708a-708n can be trained separately using the examples in its corresponding corpus 710a-710n. For clarity, the training of a single model component 708a is described. The other domain-specific model components 708b-708n can be trained in the same manner.

In some implementations, the parameters of the domain-specific model component 708a are trained using SGD, with the output of the language model 701 being used to determine the gradient for SGD training. The training examples used to train the model component 708a are all from corpus 710a, and thus match the New York City domain of the model component 708a. The baseline model component 706, which operates independent of non-linguistic domain information, is used to generate all outputs of the language model 701, regardless of which domain or domains the input information may be in. The domain-specific model component 708a is also used to generate the output of the language model, but only when the non-linguistic context for the input to the model indicates that the corresponding domain is appropriate, e.g., when scoring language occurring in New York City. When training domain-specific model components, the output of the language model 701, which is used as the gradient for SGD, is determined based on the features of the language context data 710 as well as non-linguistic context data 720. Thus, for a given training example, the gradient is based on the weights of the baseline model component 706 and the weights of domain-specific model component(s) 708a-708n relevant to the training example, even though the weights of the baseline model component 706 are fixed and not updated.

For each training example, the computing system 702 can determine which domains are "triggered" by a match to the non-linguistic context of the training example. When a domain is triggered or made active during training, the domain-specific model component 708a-708n for the domain is used to generate the score output by the language model 701 that is used as the gradient for SGD. Additionally, the parameters of the domain-specific model component 708a-708n for a triggered domain are updated through the SGD process. On the other hand, domain-specific model components 708a-708n for domains that are not triggered are not used to generate the output by the language model 701, and their weights are not updated based on the current training example.

In some instances, during training of domain-specific components, a single domain-specific model component 708a-708n is active and updated at a time. For example, if a training example is labeled as corresponding to only one domain, the single domain-specific model component for that domain can be used to generate the gradient and have its parameters updated based on the example. In other instances, multiple domain-specific model components 708a-708n can be simultaneously be used to generate the gradient and can be updated based on the same example. For example, a particular training example may be labeled as text of an utterance from a speaker who was located in New York City on a weekend, who was using a maps application. Model components for three different domains may be used as a result, e.g., a New York City model component, a weekend model component, and a maps application component. All three of these domain-specific components can be used, with the baseline model component 706, to generate the gradient, and the parameters of one or all of the three domain-specific components can be updated based on the example. Other training schemes are also possible. For example, instead of training parameters of three triggered domains independently, an example that triggers three domains could be used to separately train each of the three domains.

While both the baseline model component 706 and the domain-specific model component 708a are used together to generate the output score of the language model 701, the parameters of the baseline model component 706 are fixed and do not change while training the domain-specific model components 708a-708n. Only the parameters of the domain-specific model component 708a being trained are updated based on the domain-specific examples. The baseline model component 706 weights are used to compute the gradient in the SGD process, but the baseline model component weights 706 not adjusted in the SGD process. In this manner, training data for specific domains or contexts does not improperly influence the baseline model component or decrease the accuracy for recognizing general, domain-independent speech. Also, since the output of the language model 701 always depends on the baseline model component 706, the various domain-specific model components 708a learn to adapt or fine-tune the language model score in instances where domain information increases accuracy.

Figure 8:
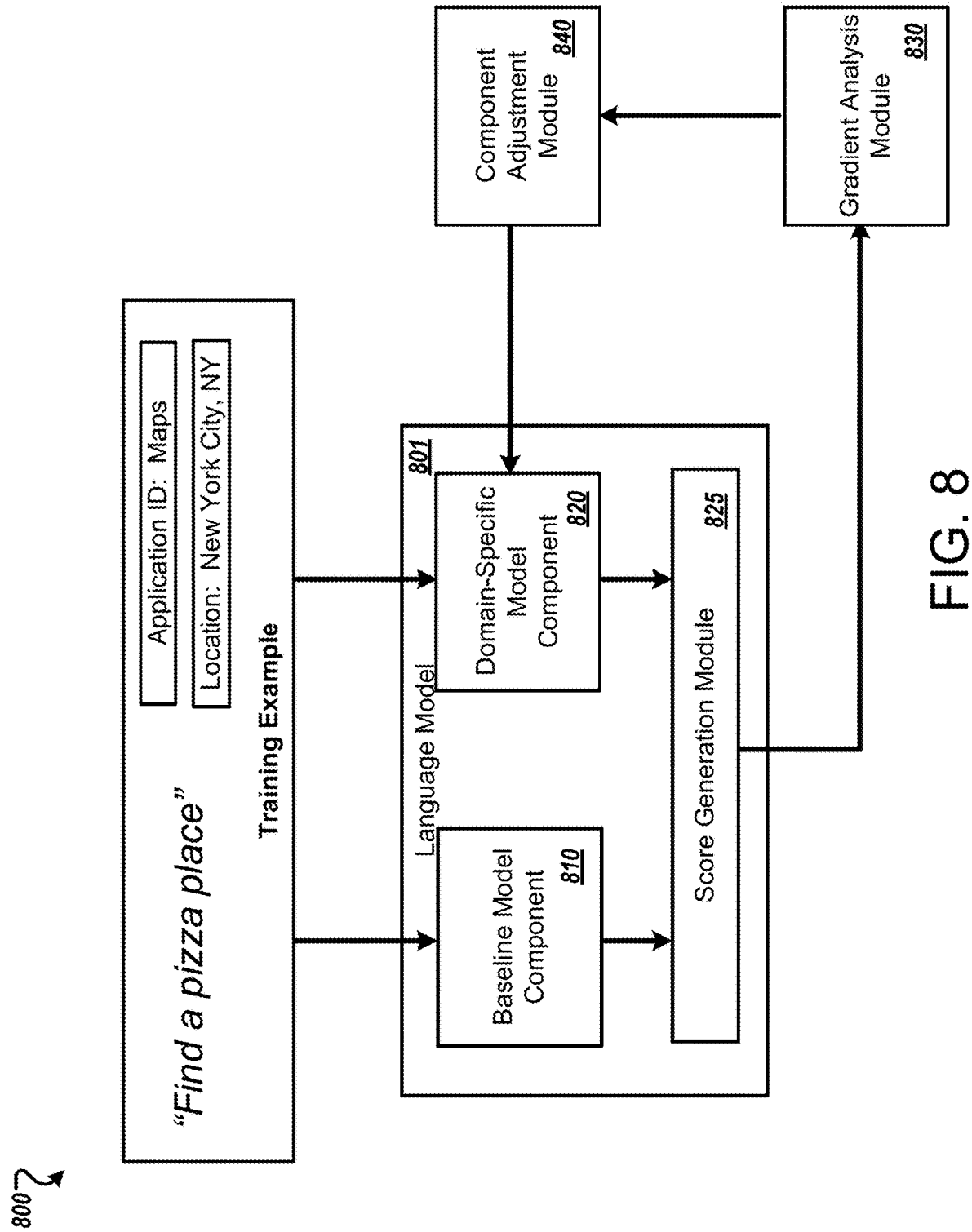
FIG. 8 is a diagram that illustrates an example of training a domain-specific model component.

The training process is described further with respect to FIG. 8. As training continues, the log-linear model weights of the domain-specific model component 708a are adjusted, while the log-linear model weights of the baseline model component 706 are not changed. In some implementations, to improve training accuracy, the learning rate, or size of the increment that parameters move during each training iteration, can vary through the course of training. For example, the learning rate may be gradually reduced during training, e.g., from 0.3, to 0.2, and then to 0.1 as training progresses.

This training approach provides a number of advantages. The baseline model is not affected by the training for specific domains, so the accuracy of the language model 701 does not degrade when used to evaluate data outside the adaptation domains. There are a relatively small number of new features in each new adaptation domain, which results in small and computationally efficient domain-specific model components. This allows a large number of domains to be served with the same language model 701. The technique allows the language model 701 to be easily extended to additional domains. When adding a new domain-specific model component for a new domain, neither the baseline model component nor the existing domain-specific model components need to be altered. Domain-specific model components can be easily and independently updated for the same reasons. Further, a sample simultaneously belonging to multiple domains can be scored appropriately by the language model 701. Although each domain-specific model component is trained separately, when an input belongs to multiple domains, the model components for multiple different domains can be used together to take into account the simultaneous presence of multiple different domain-specific factors.

After training of the language model 701 is complete, it can be used to generate scores for language sequences, e.g., to predict which language sequences are most likely. Non-linguistic context information is used to select or "trigger" which domain-specific components should be active, e.g., used by the language model 701, for scoring a particular language sequence. Depending on the context information received, zero, one, or more different domains may be identified as matching the context. Multiple domain-specific model components 708a-708n can be used simultaneously in the language model 701. For example, a user can be located in New York City and be using the Maps application. In this instance, the New York City domain of the model component 708a as well as the Maps application domain of the model component 708c would be used simultaneously. The domain-specific components for other domains not determined to be relevant would not be used. Additional information about the process of using the language model is discussed with respect to FIG. 9.

FIG. 8 is a diagram that illustrates an example of a process 800 for training a domain-specific model component. The process 800 involves a language model 801 that includes a baseline model component 810, a domain-specific model component 820, and a score generation module 825. The process also involves a gradient analysis module 830, and a parameter adjustment module 840.

In the example of FIG. 8, the domain-specific model component 820 is trained, while the baseline model component 810 remains unchanged. For clarity a single iteration of training the domain-specific model component 820 is illustrated. Training generally involves many iterations using different training examples, and the same process can be used to train many different domain-specific model components of the language model 801.

As shown in FIG. 8, data indicating a training example 805 is provided to the language model 801. The training example 805 indicates a language sequence, and so provides a linguistic context that can be used to determine which n-gram features should be made active to generate a language model score. The training example 805 also includes non-linguistic context information, e.g., indicating that the text was entered in New York City, which is the domain of the domain-specific model component 820.

The baseline model component 810 can be a general language model that is trained to predict language sequences based on linguistic context data, as discussed for the baseline model component 706 of FIG. 7. The baseline language model 810 can be used by the computing system 702 to determine likelihoods of language sequences based on the linguistic context data. The baseline language model 810 can be a log-linear language model. The domain-specific model component 820 can also be a log-linear model.

The information about the training example 805 is used to activate features of both the baseline model component 810 and the domain-specific model component 820. The weights for n-gram features of both components 810, 820 that match the training example 805 are used to by the language model 801 to generate a language model score 828. For example, a score generation module 825 of the language model 801 can use the weights of both components 810, 820 to determine the language model score 828, which can be provided to a gradient analysis module 830. In the example of FIG. 8, only a single non-linguistic domain is triggered, and so only one domain-specific model component 820 is used to generate the language model score 828. When the non-linguistic context data for a training example matches multiple domains, then the domain-specific model component for each matching domain can be used to generate the language model score 828.

The gradient analysis module 830 determines a gradient for SGD training using the language model score 828. Information about the gradient is provided to a parameter adjustment module 840 which determines weights of the domain-specific model component 820 to adjust based on the gradient. The parameter adjustment module 840 may also determine the amount of adjustment, for example, by determining or setting an appropriate learning rate step for the adjustment.

While the weights of the baseline model component 810 and the weights of the domain-specific model component 820 are both used to generate the language model score 828 and thus the gradient for SGD training, only the weights of the domain-specific model component 820 are changed. This preserves the accuracy of the baseline model component 820, while training the domain-specific model component 820 to adapt the output of the language model 801 for a specific domain. If multiple domains are triggered for a given example, then the parameters for the domain-specific model components of each of the triggered domains may be updated during the training iteration.

The same techniques can be used to train domain-specific model components for other domains. For example, the domain-specific model component 820 could alternatively correspond to a particular domain such as the SMS application domain. In the instance where the training data 805 includes the phrase "hi Joe," entered to an SMS application, the unigram feature of "hi" can be determined to be present by the computing system. The presence of this unigram can be indicated to both the baseline model component 810 and an SMS domain model component, and the output of both components can be used to determine a language model score.

In some implementations, the training process incrementally adjusts the value of a weight for a particular feature based on the presence of the n-gram for the particular feature being present in the training example 805. For example, the parameter adjustment model can move the parameters toward the calculated gradient for each example that corresponds to the particular feature.

Figure 9:
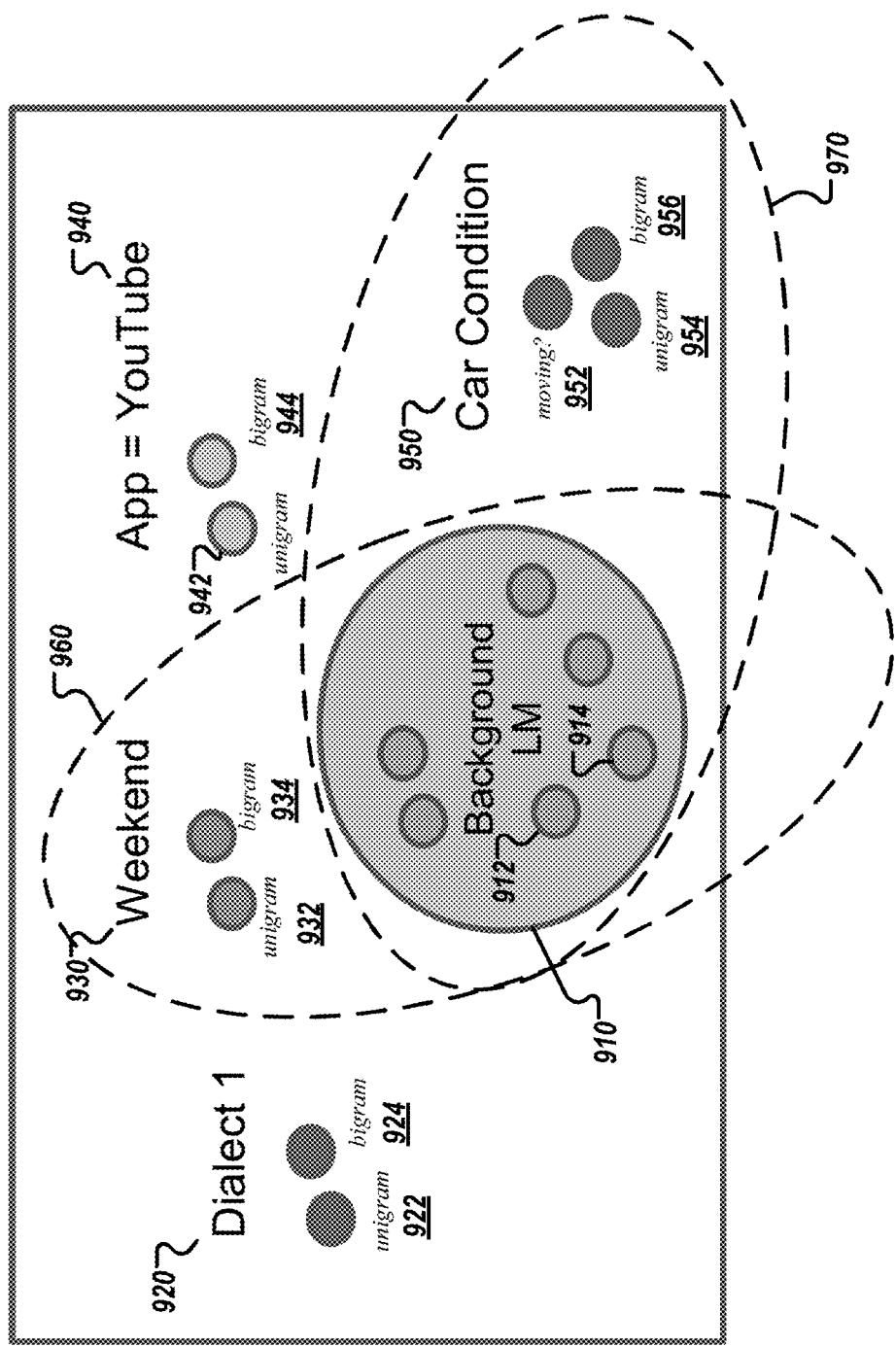
FIG. 9 is a diagram that illustrates examples of a baseline language model and domain-specific language models.

FIG. 9 is a diagram that illustrates an example of a language model 900 that includes a baseline or background language model component 910 and domain-specific model components for various different domains 920, 930, 940, 950. The baseline or background language model component 910 can have the features as discussed above for baseline language model components 706 and 810 as discussed above. The baseline language model component 910 can be used to determine language model scores for all inputs, regardless of the non-linguistic context or domain involved. One or more of the domain-specific model components may be selectively used with the background language model 910, depending on the non-linguistic context of an utterance. Thus, language model 900 can determine whether each domain-specific model component should be used to adapt or adjust the output of the baseline model component 910, depending on whether the domains are currently relevant to the situation of the speaker whose utterance is being recognized.

In some aspects, the language model includes domain-specific language models for a dialect domain 920, a weekend domain 930, a YouTube application domain 940, and a car condition domain 950. The dialect domain 920 represents the condition where a user speaks a particular dialect, the weekend domain 930 represents the condition in which the user is speaking on a weekend, the YouTube application domain 940 represents that the user is providing input to the YouTube application, and the car condition domain 950 represents that the user is in a vehicle.

The domain-specific language models can include n-gram feature sets similar to the feature sets of the background language model 910. Each domain-specific language model can have a unigram feature set and a bigram feature set. For example, the dialect domain 920 can include a unigram feature 922 and a bigram feature 924. In another example, the Weekend domain 930 can include a unigram feature set 932 and a bigram feature set 934. In another example, the YouTube Application domain 940 can include a unigram feature set 942 and a bigram feature set 944. Further, the Car Condition domain 950 can include a moving feature set 952, a unigram feature set 954, and a bigram feature set 956. As such, the domain-specific language models can include multiple feature sets.

The language model 900 can be used in an automated speech recognizer to recognize speech. For example, the language model 900 can be used to re-score a set of candidate transcriptions. For example, the language model 900 can be used as the language model 150 of FIG. 1. For example, a first-pass language model, e.g., one in the speech recognizer module 130 of FIG. 1, can provide data indicating candidate transcriptions. In some implementations, the first-pass language model may not take into account non-linguistic context, although in other implementations it may take into account non-linguistic context. The first-pass language model may be a log-linear model or another type of model. A subset of the candidate transcriptions, e.g., a particular of the most likely candidate transcriptions, such as the top 10, 20, 50, or another number, can be selected based on the language model scores of the first-pass model. The language model 900 can then be used as a second-pass model to generate a likelihood score for each of the candidate transcriptions in the subset. Once the new language model scores are determined for the candidate transcriptions using the language model 900, a most likely transcription can be selected based on the scores. For example, the candidate transcriptions may be ranked according to the likelihoods indicated by the scores from the language model 900, and the highest-ranked candidate transcription can be provided as a speech recognition result. In some implementations, multiple candidate transcriptions are provided, e.g., the top three or five most likely candidate transcriptions, as determined from the scores of the language model 900.

The language model 900 uses the baseline model component for each recognition. The baseline model is adapted through the use of the domain-specific model components. For a given utterance, zero, one, or more of the domain-specific model components are used, depending on the non-linguistic context that the utterance was spoken in. As discussed below, the scoring function changes, due to the combined use of different sets of model components, according to the domains which are considered to be active.

In general, the output score of the language model 900 can be a probability score, such as the one give by the equation below.

$$P(y \mid x; w) = \frac{\exp(wf(x, y))}{Z}$$

This score gives the probability of a word, y, given a context, x, and the training state of the model, represented by weights w. The numerator is a function of the weights, w, the context, x, and the word being predicted, y. The denominator, Z, represents a scaling factor, such as the sum of the values of all the weights, w, for all features in the model.

Each of the components of the language model 900 may include one or more feature sets. Each feature set represents a group of features having corresponding weights in the log-linear model. For example, one feature set may represent unigram features, another may represent bigram features, another feature set may represent trigram features, and so on. Still other feature sets may represent backoff features, skip-gram features, or other types of features. The baseline model component can include multiple feature sets, and typically includes additional types of features that are not included in domain-specific model components. For example, the baseline model component may include unigram, bigram, trigram, and skip-gram feature sets, while domain-specific model components may include only unigram and bigram feature sets. Further, feature sets of the baseline model component generally include many more features than corresponding feature sets of the domain-specific model components. For example, the unigram feature set for the baseline model may include many more features than the unigram feature set of a particular domain-specific model component, e.g., twice as many, or ten times as many, or more.

When non-linguistic context is not available, or if none of the domain-specific model components have a domain that matches the current non-linguistic context, then the baseline model component alone is used to generate the language model score. The score in this case can be determined as indicated below.

$$P(y \mid h; w) = \frac{\exp(w_{unigram(y)} + w_{bigram(y,h)} + w_{trigram(y,h)} + \ldots + w_{skips(y,h)})}{Z}$$

The term h, represents linguistic context, such as prior words or surrounding words near the word, y. This shows that the baseline model component uses only linguistic information, e.g., the word, y, being predicted and linguistic context, h. Feature sets in the baseline model component are shown in the equation as different terms in the numerator, e.g., $w_{unigram}$ to represent the unigram feature set, $w_{bigram}$ representing the bigram feature set, $w_{trigram}$ representing the trigram feature set, and $w_{skips}$ representing a skip-gram feature set. Other feature sets, or different combinations of feature sets, may be used.

For each feature set, the speech recognition system determines a feature vector based on the word, y, and the linguistic context, h. The vectors can be binary vectors, with a value of "1" indicating that the feature is active, and a value of "0" for features that are not active, e.g., not present. Each feature vector is multiplied by the corresponding weight vector for the feature set. Thus $w_{bigram(y,h)}$ represents the set of weights in the bigram feature set for the specific features active given y and h. The result of this process causes the numerator to include, in the exp( ) function, the sum of all the weights for all active features over all of the baseline model feature sets. The denominator Z represents the sum of all feature weights over all the feature sets, for both active and non-active features. The denominator thus represents the sum of all the weight values in the baseline model component.

When non-linguistic context data is available, the language model 900 can dynamically alter the scoring technique based on which domains are applicable to the utterance being recognized. For example, the a map application model component can be used in addition to the baseline model component if the user is providing voice input to a map application. As another example, a New York City location model component can be used with the baseline model component if the utterance was entered in New York City. Model components can be selected from among components for many different domains, such as (i) regional dialect or accent domains, e.g., North African French, Canadian French, etc.; (ii) time domains, e.g., weekend, weekday, daytime, nighttime, etc.; (iii) location domains, e.g., New York City, Los Angeles, San Francisco, etc.; (iv) movement status domains, e.g., user is walking, user is driving, user is stationary, etc.; (v) device domains, e.g., device characteristics or device status, such as whether the device receiving input is a smartphone, a wearable device, has a particular operating system, etc.; (vi) user characteristic domains, e.g., user has a high-pitched voice, user is male, user is female, etc.; (vii) ambient condition domains, e.g., high noise level, low noise level, etc.; and (viii) application domains, e.g., voice input provided to a map application, a media player application, a store application, a browser application, etc.

The speech recognition system determines, from among the different domain-specific model components, which components correspond to non-linguistic context for the utterance being recognized. The baseline model component can be adapted using one or multiple of the domain-specific model components that are determined to be relevant to the utterance. For example, GPS data or other location data may be used to determine that the speaker of the utterance is located in a particular city, and then the domain-specific model component for that city is selected to adapt the baseline model. The language model score is then determined based on the linguistic context, h, as well as the non-linguistic context, c, as shown below.

$$P(y \mid h, c; w) = \frac{\exp(w_{unigram(y)} + w_{bigram(y,h)} + w_{trigram(y,h)} + \ldots + w_{global_1(y,h,c)} + w_{global_2(y,h,c)} + \ldots)}{Z}$$

In this example, a domain-specific model component includes two feature sets, represented by $w_{global1}$ and $w_{global2}$. A feature vector would be determined for each of these feature sets, and multiplied by the weight vector for each feature set. This adds, within the exp( ) function, the weights from the feature sets of the adaptation domain, and thus adjusts the overall likelihood determined for the word y, relative to the likelihood that the baseline model component would indicate. The feature sets of multiple domain-specific model components can be used together, to simultaneously adapt the output of the baseline model component for multiple different domains. This technique uses the log-linear model weights of the selected domain-specific model component(s) in the same score calculation that the baseline model component log-linear weights are used.

In the example of FIG. 9, the grouping 960 shows the set of model components used when the weekend context is present, but other domains are not active. The grouping 970 shows the feature sets used when the user is determined to be in a vehicle, but the other domains are not active. This shows how different components of the model are selected and incorporated into the scoring function discussed above, based on the non-linguistic context that has occurred.

In addition to using the feature sets and weights of the selected domain-specific model component(s), the denominator, Z, is also updated to reflect the addition of the domain-specific model component(s). For example, rather than being a sum of all weights of the baseline model component only, the denominator can represent a sum of all weights over the baseline model component and all domain-specific model component(s) used.

Thus, over a series of utterances, as the non-linguistic context of a speaker changes, the domain-specific model components used and the scoring function of the language model 900 also change.

During training of a domain-specific model component, the equation for P(y|h,c;w) discussed above can be used. However, in the SGD training process, the weights of the baseline model component feature sets, e.g., $w_{unigram}$, $w_{bigram}$, and $w_{trigram}$, are held constant while the weights of the domain-specific model component feature sets, e.g., $w_{global1}$ and $w_{global2}$, are adjusted based on training example. As discussed above, this maintains the integrity of the baseline model, while learning adaptation parameters in the weights of the domain-specific feature sets.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method performed by one or more computers, the method comprising:
    obtaining context data for an utterance, the context data indicating (i) a linguistic context that includes one or more words preceding the utterance, and (ii) a non-linguistic context;
    selecting, from among multiple domain-specific model components of a language model that have been respectively trained for different groups of features, a subset of the domain-specific model components to use in recognizing the utterance, the subset of the domain-specific model components being selected based on the non-linguistic context of the utterance, wherein each of the domain-specific model components corresponds to a different aspect of non-linguistic context, wherein the domain-specific model components comprise different sets of n-gram features for n-grams, and wherein each of the domain-specific model components has corresponding weights for its n-gram features trained based on language examples from multiple users that occur in the aspect of non-linguistic context corresponding to the domain-specific model component;
    generating a score for a candidate transcription for the utterance using the language model, the score being generated using (i) the selected subset of the domain-specific model components, and (ii) a baseline model component of the language model that is domain-independent and includes corresponding weights for a respective set of features, wherein the score is generated without using the domain-specific model components that were not selected;
    determining a transcription for the utterance using the score; and
    providing the transcription as output of an automated speech recognition system,
    wherein the language model comprising the baseline model component and the multiple domain-specific model components is trained by, for each of a plurality of training language examples each labeled as occurring in one or more particular aspects of non-linguistic context:
        triggering, for use in training the language model on the corresponding training language example in unison with the baseline model component, one or more of the domain-specific model components that correspond to at least one of the one or more particular aspects of non-linguistic context that the corresponding training language example is labeled as occurring in;
        generating, as output from the language model, using both the corresponding weights of the baseline model component and the weights of the one or more triggered domain-specific model components, a language model score; and
        updating, using the language model score output from the language model, the weights of the one or more triggered domain-specific model components without updating the corresponding weights of the baseline model component.

2. The method of claim 1, wherein the domain-specific model components each correspond to a different domain in a set of multiple domains, and the baseline model does not correspond to any of the multiple domains.

3. The method of claim 1, wherein the baseline model component is configured to provide a the language model score independent of non-linguistic context information.

4. The method of claim 1, wherein the baseline model component and each of the domain-specific model components are log-linear models, each of the log-linear models comprising weights corresponding to a respective set of features.

5. The method of claim 4, wherein the respective set of features for each of the log-linear models comprises n-gram features.

6. The method of claim 5, wherein the baseline model component includes weights for features that represent occurrence of n-grams independent of non-linguistic context; and
    wherein the domain-specific model components include weights for features that represent occurrence of n-grams in specific non-linguistic contexts, each of the domain-specific model components having weights for a different non-linguistic context.

7. The method of claim 1, wherein the language model includes (i) the baseline model component, which uses linguistic context information and does not use non-linguistic context information, and (ii) the domain-specific model components, which use both linguistic context information and non-linguistic context information.

8. The method of claim 1, wherein each of the domains corresponds to at least one of a location, a time condition, a user characteristic, a device characteristic, or a device status.

9. The method of claim 1, wherein generating the score for the candidate transcription comprises:
    generating the score using a scoring function that changes according to which domain-specific model components are selected.

10. The method of claim 1, wherein generating the score for the candidate transcription comprises:
    determining (i) first feature values for first n-gram features of the baseline model component and (ii) second feature values for second n-gram features of a particular domain-specific model component in the selected subset.

11. The method of claim 10, wherein the second n-gram features of the particular domain-specific model component correspond to a subset of words or phrases having n-gram features in the baseline model component, but represent occurrence of the words or phrases in a particular non-linguistic context associated with the domain-specific model component.

12. The method of claim 10, wherein generating the score for the candidate transcription for the utterance using the language model comprises:
    multiplying the first feature values with corresponding weights for the first n-gram features in the baseline model;
    multiplying the second feature values with corresponding weights for the second n-gram features in the particular domain-specific model component; and
    generating the score using a sum of results of the multiplications.

13. The method of claim 10, wherein generating the score for the candidate transcription for the utterance using the language model comprises:
determining a sum of (i) weights for the first n-gram features of the baseline model and (ii) weights for the second n-gram features of the particular domain-specific model component; and
generating the score based on the sum.

14. The method of claim 1, further comprising:
obtaining data indicating multiple candidate transcriptions for the utterance;
generating a score for each of the multiple candidate transcriptions, wherein the score for each of the multiple candidate transcriptions is generated using the baseline language model component and the selected domain-specific model component; and
wherein determining the transcription for the utterance comprises selecting, as the transcription for the utterance, a particular candidate transcription of the multiple candidate transcriptions based on the generated scores.

15. The method of claim 1, wherein each of the domain-specific model components has multiple feature sets.

16. The method of claim 15, wherein generating the score for the candidate transcription comprises generating the score using at least one, but less than all, of the feature sets of the selected domain-specific model component.

17. The method of claim 15, wherein generating the score for the candidate transcription comprises generating the score using all of the feature sets of the selected domain-specific model component.

18. An automated speech recognition system comprising:
one or more computers and one or more computer-readable storage media storing instructions that, when executed by the one or more computers, cause the one or more computers to perform operations comprising:
obtaining context data for an utterance, the context data indicating (i) a linguistic context that includes one or more words preceding the utterance, and (ii) a non-linguistic context;
selecting, from among multiple domain-specific model components of a language model that have been respectively trained for different groups of features, a subset of the domain-specific model components to use in recognizing the utterance, the subset of the domain-specific model components being selected based on the non-linguistic context of the utterance, wherein each of the domain-specific model components corresponds to a different aspect of non-linguistic context, wherein the domain-specific model components comprise different sets of n-gram features for n-grams, and wherein each of the domain-specific model components has corresponding weights for its n-gram features trained based on language examples from multiple users that occur in the aspect of non-linguistic context corresponding to the domain-specific model component;
generating a score for a candidate transcription for the utterance using the language model, the score being generated using (i) the selected subset of the domain-specific model components, and (ii) a baseline model component of the language model that is domain-independent and includes corresponding weights for a respective set of features, wherein the score is generated without using the domain-specific model components that were not selected;
determining a transcription for the utterance using the score; and
providing the transcription as output of the automated speech recognition system,
wherein the language model comprising the baseline model component and the multiple domain-specific model components is trained by, for each of a plurality of training language examples each labeled as occurring in one or more particular aspects of non-linguistic context:
triggering, for use in training the language model on the corresponding training language example in unison with the baseline model component, one or more of the domain-specific model components that correspond to at least one of the one or more particular aspects of non-linguistic context that the corresponding training language example is labeled as occurring in;
generating, as output from the language model, using both the corresponding weights of the baseline model component and the weights of the one or more triggered domain-specific model components, a language model score; and
updating, using the language model score output from the language model, the weights of the one or more triggered domain-specific model components without updating the corresponding weights of the baseline model component.

19. One or more non-transitory computer-readable media storing instructions that, when executed by one or more computers, cause the one or more computers to perform operations comprising:
obtaining context data for an utterance, the context data indicating (i) a linguistic context that includes one or more words preceding the utterance, and (ii) a non-linguistic context;
selecting, from among multiple domain-specific model components of a language model that have been respectively trained for different groups of features, a subset of the domain-specific model components to use in recognizing the utterance, the subset of the domain-specific model components being selected based on the non-linguistic context of the utterance, wherein each of the domain-specific model components corresponds to a different aspect of non-linguistic context, wherein the domain-specific model components comprise different sets of n-gram features for n-grams, and wherein each of the domain-specific model components has corresponding weights for its n-gram features trained based on language examples from multiple users that occur in the aspect of non-linguistic context corresponding to the domain-specific model component;
generating a score for a candidate transcription for the utterance using the language model, the score being generated using (i) the selected subset of the domain-specific model components, and (ii) a baseline model component of the language model that is domain-independent and includes corresponding weights for a respective set of features, wherein the score is generated without using the domain-specific model components that were not selected;
determining a transcription for the utterance using the score; and
providing the transcription as output of an automated speech recognition system,
wherein the language model comprising the baseline model component and the multiple domain-specific model components is trained by, for each of a plurality of training language examples each labeled as occurring in one or more particular aspects of non-linguistic context:

triggering, for use in training the language model on the corresponding training language example in unison with the baseline model component, one or more of the domain-specific model components that correspond to at least one of the one or more particular aspects of non-linguistic context that the corresponding training language example is labeled as occurring in;

generating, as output from the language model, using both the corresponding weights of the baseline model component and the weights of the one or more triggered domain-specific model components, a language model score; and updating, using the language model score output from the language model, the weights of the one or more triggered domain-specific model components without updating the corresponding weights of the baseline model component.

\* \* \* \* \*